(12) United States Patent
Buthker

(10) Patent No.: US 9,769,898 B1
(45) Date of Patent: Sep. 19, 2017

(54) ADJUSTED PULSE WIDTH MODULATION (PWM) CURVE CALCULATIONS FOR IMPROVED ACCURACY

(71) Applicant: NXP B.V., Eindhoven (NL)

(72) Inventor: Henricus Cornelis Johannes Buthker, Mierlo (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/373,024

(22) Filed: Dec. 8, 2016

(51) Int. Cl.
  *H05B 37/02* (2006.01)
  *H05B 33/08* (2006.01)
  *B60Q 1/14* (2006.01)

(52) U.S. Cl.
  CPC ....... *H05B 33/0845* (2013.01); *H05B 33/083* (2013.01); *B60Q 1/1423* (2013.01); *B60Q 2300/114* (2013.01); *B60Q 2300/312* (2013.01); *B60Q 2300/314* (2013.01); *B60Q 2300/42* (2013.01)

(58) Field of Classification Search
  CPC ... H05B 33/083; H05B 33/0845; H05B 37/02
  See application file for complete search history.

(56) References Cited

U.S. PATENT DOCUMENTS

| | | | | |
|---|---|---|---|---|
| 2006/0038803 | A1* | 2/2006 | Miller | H05B 33/0815 345/204 |
| 2007/0257623 | A1* | 11/2007 | Johnson | H05B 33/0818 315/193 |
| 2007/0262724 | A1 | 11/2007 | Mednik et al. | |
| 2009/0179575 | A1 | 7/2009 | Mednik et al. | |
| 2010/0134018 | A1* | 6/2010 | Tziony | H05B 33/083 315/122 |
| 2013/0082616 | A1* | 4/2013 | Bradford | H05B 33/0893 315/193 |
| 2013/0193852 | A1* | 8/2013 | Frattini | H05B 37/036 315/122 |
| 2015/0189711 | A1* | 7/2015 | Horsky | H05B 33/083 315/186 |

(Continued)

OTHER PUBLICATIONS

Kim, Minho, "Mathematical Models for Engineering Problems and Differential Equations," University of Seoul, School Computer Science, 2010, 20 pages.

(Continued)

*Primary Examiner* — Don Le

(57) ABSTRACT

An LED controller includes: an absolute value calculator to calculate an initial light intensity value for a desired light output curve; a fade-in calculator to calculate a first light intensity value; and a fade-out calculator to calculate a second light intensity value. The LED controller also includes processing logic configured to: select one of the fade-in calculator and the fade-out calculator as a selected incremental value calculator, based on a directional indicator that indicates whether a fade-in light output effect or a fade-out light output effect is requested, initialize coefficients of the absolute value calculator and the selected incremental value calculator with a set of coefficient values associated with the desired light output curve, and output a set of voltage levels to a set of pulse width modulation (PWM) generators that output a set of PWM signals, which control light output of a string of LEDs.

20 Claims, 9 Drawing Sheets

(56) References Cited

U.S. PATENT DOCUMENTS

2016/0165678 A1* 6/2016 Sudhaus ............. H05B 33/083
　　　　　　　　　　　　　　　　　　　　　　　315/161
2016/0227616 A1* 8/2016 Lee ................... H05B 33/0815

OTHER PUBLICATIONS

Dr. Dobbs, "Forward Difference Calculation of Bezier Curves," Dr. Dobb's The World of Software Development, http://www.drdobbs.com/forwarddifferencecalculationofbezier/184403417, Nov. 1, 1997, 6 pages.

U.S. Appl. No. 15/270,902, filed Sep. 20, 2016.

* cited by examiner

ADJUSTED PULSE WIDTH MODULATION (PWM) CURVE CALCULATIONS FOR IMPROVED ACCURACY

BACKGROUND

Field

This disclosure relates generally to a light emitting diode (LED) controlling circuit, and more specifically, to an LED controlling circuit that utilizes pulse width modulation (PWM) signals.

Related Art

Light emitting diodes (LEDs) are often used as light sources in lighting displays. The light output capability of LEDs has increased greatly over the years, from replacing small incandescent bulbs in consumer electronic devices, to being implemented in headlight assemblies of automobiles. Advantages of using LEDs over incandescent light sources include lower energy consumption, longer lifetime, physical robustness, smaller size, and faster switching, to name a few.

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted.

Figure 1:
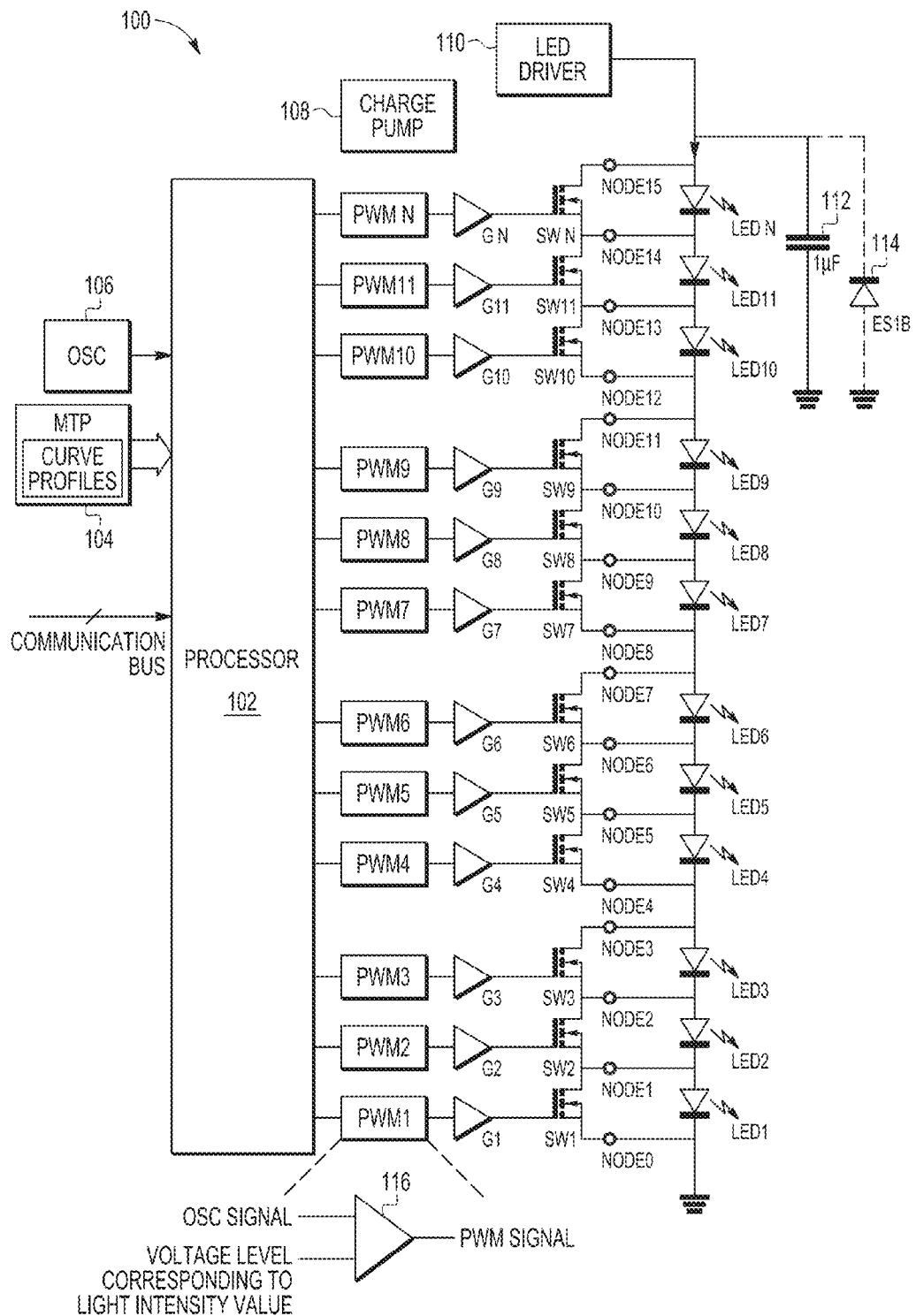
FIG. 1 illustrates a block diagram depicting an example light emitting diode (LED) controller system in which the present disclosure is implemented, according to some embodiments.

Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Overview

The present disclosure provides a light emitting diode (LED) controller that is able to individually control the light output of one or more LEDs in a matrix LED display. An LED controller is configured to implement a desired light output curve at the one or more LEDs using one or more pulse width modulation (PWM) signals that change the brightness level of the light output at the one or more LEDs. The PWM signals are generated based on a sequence of light intensity values calculated by the LED controller according to a polynomial function that represents the desired light output curve, also referred to herein as a PWM curve. In order to avoid discontinuities in the calculated light intensity values which may be perceived as flicker, a differential version of the polynomial function is used to calculate incremental values to determine a next light intensity value from a previously calculated light intensity value. While this incremental approach provides a smoother light output curve at the LEDs (as compared with calculating absolute values for each light intensity value), the present disclosure also provides for additional error corrections and accuracy corrections for this incremental approach, in order to ensure that the light output achieved at the one or more LEDs is true to the desired light output curve and that the full brightness range from 0% to 100% brightness can be implemented at the LEDs.

The LED controller implements an absolute value calculator that implements the polynomial function and is configured to calculate an initial light intensity value. The LED controller also implements a fade-in calculator for calculating incremental values for a fade-in effect in the light output at the LEDs (where a stop light intensity value is greater than a start light intensity value), and a fade-out calculator for calculating incremental values for a fade-out effect in the light output at the LEDs (where a start light intensity is greater than the stop light intensity value). A first incremental value calculated by either the fade-in or fade-out calculators (depending on whether the fade-in or fade-out effect is requested) is added to the initial light intensity value to produce a next light intensity value. A subsequent incremental value is calculated and added to the previously calculated light intensity value to provide a presently calculated light intensity value.

One or more LED controllers are coupled to a central LED microcontroller that coordinates light output of one or more matrix LED displays. In order to reduce the amount of data transmitted between the central LED microcontroller and the one or more LED controllers, each LED controller is configured to store a plurality of PWM curve profiles locally, where each PWM curve profile includes a set of coefficients that represent a particular PWM curve and each PWM curve profile is associated with a unique PWM curve identifiers (ID). When the LED controller receives a PWM curve ID from the central LED microcontroller, processing logic of the LED controller uses the PWM curve ID to retrieve the associated PWM curve profile from local memory, and initializes the absolute value calculator and at least one of the fade-in or fade-out incremental value calculator with the set of coefficients.

A scaling parameter is also used to vary the time over which a light output curve is completed at the LEDs. The scaling parameter, the set of coefficients, or both may be changed in an "on-the-fly" or dynamic manner (e.g., due to an indication received from an automotive CPU in response to a detected condition of the automobile). The implementation of the absolute value calculator, the fade-in incremental value calculator, and the fade-out incremental value calculator of the present disclosure is robust enough to handle the changes dynamically and minimize any discontinuities, reducing perceivable flicker.

EXAMPLE EMBODIMENTS

FIG. 1 illustrates a block diagram depicting an example light emitting diode (LED) controller system 100 configured to control light output of one or more LEDs in a matrix LED display. Components of the LED controller system 100 (or simply LED controller 100) include a processor 102, a multiple time programmable (MTP) memory 104 communicatively coupled to the processor 102 and configured to store a plurality of light output curve profiles (further discussed below), and an oscillator 106 configured to provide an oscillating signal (such as a digital saw-tooth signal) at a frequency in the range of 200 to 1000 MHz, which may be used as the clock signal for the processor 102. In some embodiments, the MTP memory 104 is implemented as part of a same integrated circuit that includes the processor 102. In other embodiments, the processor 102 is coupled to MTP memory 104 via a local short-distance peripheral communication bus, where the processor 102 and MTP memory 104 are implemented on a same printed circuit board (PCB). The processor 102 is also coupled to a communication bus to receive data from a central LED microcontroller, as further discussed below in connection with FIG. 13.

Components of the LED controller 100 also include an N number of pulse width modulation (PWM) generators (shown as PWM1-PWM N) that are coupled to the processor 102 by an N number of output lines, an N number of gate drivers (shown as G1-G N) that are each coupled to an output of a respective PWM generator, and an N number of switches (shown as SW1-SW N) that each have a control electrode coupled to an output of a respective gate driver. Each switch is coupled in parallel with a respective LED of the matrix LED display, as discussed below. A charge pump 108 is also coupled as a power supply voltage to each gate driver, where the charge pump 108 may be implemented as a DC (direct current) to DC converter.

In the example shown, the matrix LED display includes an N number of LEDs (shown as LED1-LED N) connected to the nodes of switches SW1-SW N (shown as NODE0-NODE15), which may be implemented using suitable p-n junction diodes that emit light (e.g., visible light) when activated. The N number of LEDs are connected in series as a string of LEDs, with an anode of one LED coupled to a cathode of a next LED. The first LED in the string (LED1) has a cathode coupled to ground and a last LED in the string (LED N) has an anode coupled to an LED driver 110 that is configured to provide a constant current to the string. The LED driver 110 may be implemented as a DC to DC converter. It is noted that the number N is an integer equal to or greater than one, where the N number of LEDs is limited in order to limit the maximum voltage applied to the string of LEDs to safe voltage levels. In the example shown, N equals 12 to limit the maximum string voltage to levels below 60V, although other values of N may be used in other implementations to remain within other safe voltage levels. Also, the N number of LEDs may be divided into substrings, such as four substrings of 3 LEDs (e.g., LED1-LED3 form a substring, LED4-LED6 form another substring, and so on).

In the embodiment shown, switches SW1-SW N are implemented using n-type transistors, such as a MOSFET (metal-oxide-semiconductor field effect transistor), although other suitable types of transistors or suitable switching elements may be utilized. A first current electrode (such as a drain electrode) of each switch is coupled to an anode of a respective LED and the second current electrode (such as a source electrode) of each switch is coupled to a cathode of the respective LED. Each switch also has a control electrode (such as a control gate electrode) coupled to the output of a respective gate driver. The signal provided by the gate driver closes the switch (e.g., makes the transistor conductive) or opens the switch (e.g., makes the transistor nonconductive). When the switch is opened, current flows through the LED, which turns on and emits light. By closing the switch, the LED is shorted, which turns off and no longer emits light.

In order to change the perceived light output of the LED, the switch is quickly opened and closed using a pulse width modulation (PWM) signal that is output by the PWM generator and delivered to the switch control electrode by the gate driver. As shown in the inset at the bottom of FIG. 1, each PWM generator includes a comparator 116 having an input coupled to receive an oscillating signal (OSC signal) and an input coupled to an output line from the processor 102. The oscillating signal may be a divided version of the clock signal output by the oscillator 106, as discussed below. The processor 102 is configured to implement a number of calculators that in turn are configured to calculate light intensity values based on a selected light output curve profile retrieved from MTP memory 104. Each light output curve profile includes information that represents a light output curve, which is also referred to as a PWM curve. Each PWM curve describes a sequence of brightness levels of the light output of an LED over time, where the brightness levels each indicate an intensity of the light output of an LED, relative to a minimum light output and a maximum light output of the LED (e.g., from 0% to 100% brightness or light intensity). The calculated light intensity values, which are calculated in a sequential or serial manner, correspond to a sequential set of points on the selected PWM curve, where each light intensity value indicates a respective brightness level. Curve profile information and calculation of the light intensity values are further discussed below in connection with FIG. 13.

The processor 102 then outputs a sequence of voltage levels, each voltage level corresponding to one of the sequence of (calculated) light intensity values. Each voltage level corresponding to each light intensity value is output at an update rate determined by the PWM frequency. For an example PWM frequency of 200 Hz, the voltages are output at an update rate of every 5 ms (which indicates the light intensity values should also be calculated at a rate at least as fast as the update rate). For a given light intensity value, the processor 102 may output the same voltage level to every comparator (all LEDs have the same light output), or may output a different voltage level to each comparator (e.g., the LEDs each have a delayed light output). Each comparator 116 outputs a PWM signal (such as a square wave signal with variable duty cycle) based on the comparison of the oscillating signal and the received voltage level, where the duty cycle of the PWM signal changes based on the received voltage level corresponding to the light intensity value. Each gate driver is an amplifier configured to deliver the digital PWM signal as an analog control signal to the switches. In some embodiments, each gate driver is a power amplifier configured to deliver a high-current PWM signal to the switches.

The duty cycle of the PWM signal is the fraction or percentage of one period (or a complete on-and-off cycle) in which the PWM signal is active. For example, 100% duty cycle provides an active signal for the entire period, and 0% duty cycle provides an inactive signal for the entire period. The duty cycle of the PWM signal controls the percentage of the time the switch is closed and the LED is shorted and off. By increasing the duty cycle, the percentage of time that the switch is closed is increased, which reduces the time-averaged current through the LED and results in reducing the time-averaged brightness or light intensity of the light output at the LED. Similarly, by decreasing the duty cycle, the percentage of time that the switch is closed is decreased, which increases the time-averaged current through the LED and results in increasing the time-averaged brightness or light intensity of the LED's light output. It is noted that use of the term "brightness" herein indicates time-averaged brightness or time-averaged light intensity of the light output of an LED.

In the embodiments provided herein, a brightness resolution of 12 bits is implemented, which defines 4096 different brightness or light intensity levels between 0% brightness (full dark achieved by a duty cycle of 100%) and 100% brightness (full light achieved by a duty cycle of 0%), although other resolutions may be utilized in different embodiments. The frequency of the oscillating signal (OSC signal) provided to the PWM generators is a version of a signal output by the oscillator 106 (such as a clock signal) that is divided at least by the total number of brightness levels implemented by the brightness resolution, which is also referred to as a PWM frequency. It is noted that the on/off switching of an LED is invisible to the human eye using a PWM frequency that is within the target range of 200 to 1000 Hz, but results in a perceivable transition from one time-averaged level of brightness to another. For example, a 200 MHz clock signal is internally divided to get a 1000 kHz signal, which is then divided by the brightness resolution, or 4096, to achieve a PWM frequency of 244 Hz.

In the embodiment shown, the N number of PWM generators, gate drivers, and switches are coupled to form an N number of branches or channels, where each channel is coupled to an individual LED. The LED controller 100 is configured to control each channel in an individual manner by providing individual PWM signals to those channels. The LED controller 100 is also configured to provide a same PWM signal to groups of one or more channels, to control those channels in a collective manner. In some embodiments, the matrix LED display may further include a string of several LEDs in a given channel (e.g., 12 channels each having a string of 3 LEDs), allowing the LED controller 100 to control the several LEDs in a single channel as a group. It is noted that the matrix LED display in such embodiments may utilize a different total number of LEDs arranged in one or more strings (e.g., 8 channels each having a string of 4 LEDs), depending on the maximum safe voltage levels utilized for that matrix LED display.

Also in the embodiment shown, a capacitor 112 is coupled between the output of the LED driver 110 and ground to minimize any voltage fluctuations that may occur, which in turn minimizes any perceptible light flicker in the light output of the LEDs. An optional current limiting device ES1B is also shown in FIG. 1, coupled between ground and the anode of the last LED (LED N) in the string of LEDs (also referred to as being coupled in anti-parallel between the top of the string of LEDs and ground) to protect the LED controller 100 by limiting any extraneous current that may occur at the nodes of the switches (e.g., due to a short circuit of one of the LEDs at the bottom of the string of LEDs, causing a large negative voltage at the nodes of the switches).

Figure 13:
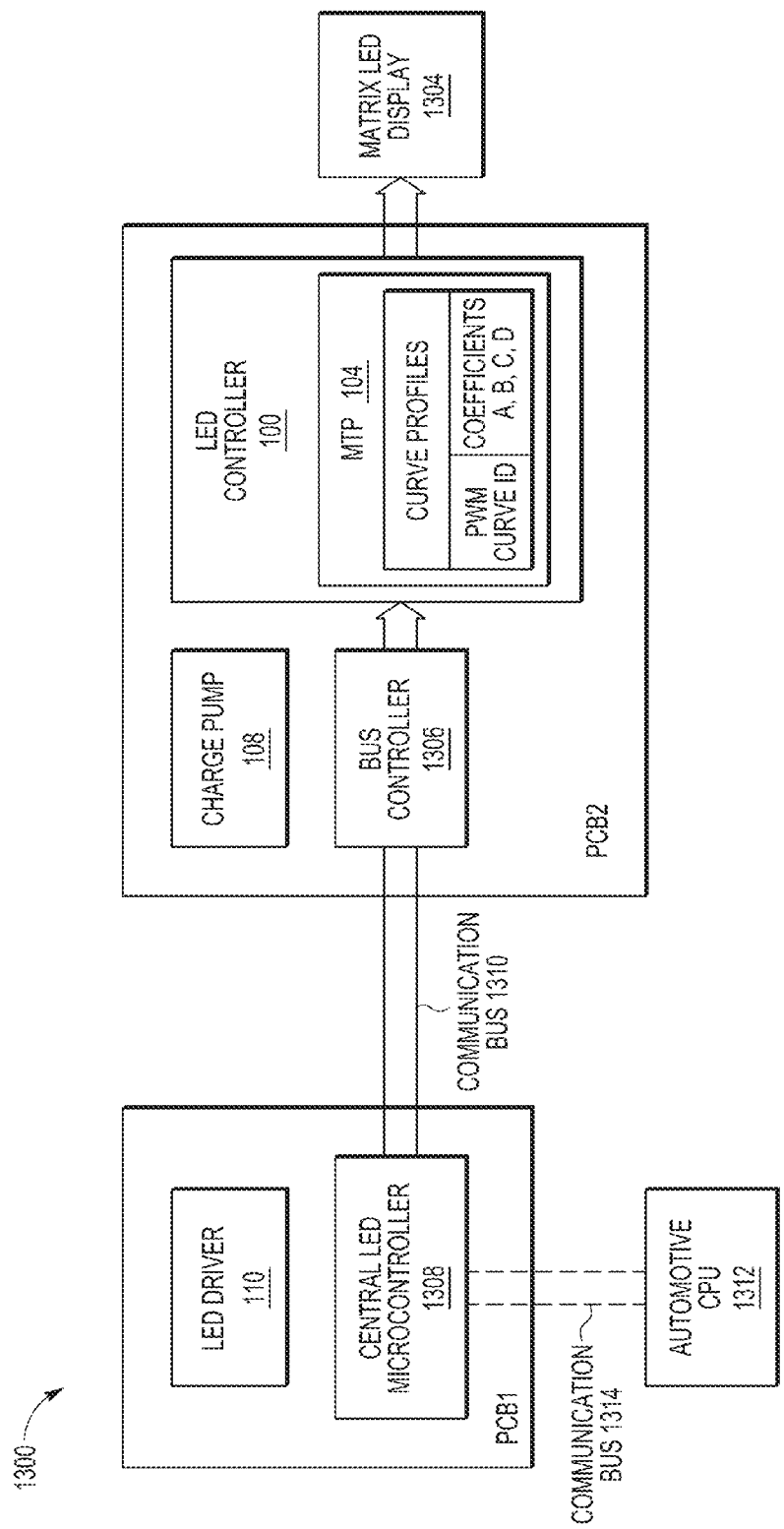
FIG. 13 illustrates a block diagram depicting an example matrix LED system in which the present disclosure is implemented, according to some embodiments.

FIG. 13 shows an example matrix LED system 1300 in which the LED controller system 100, or simply LED controller 100, may be implemented. The matrix LED system 1300 includes a central LED microcontroller 1308 that is communicatively coupled to the LED controller 100 by a communication bus 1310 and a bus controller 1306. In some embodiments, the communication bus 1310 is a controller area network (CAN) bus, or other suitable high-speed serial interface. In the example shown, the matrix LED system 1300 is implemented on two printed circuit boards (PCBs), although other embodiments may be implemented on a different number of PCBs. In the example shown, the LED driver 110 and central LED microcontroller 1308 are included on PCB1, while the charge pump 108, LED controller 100, and bus controller 1306 are included on PCB2. The PCBs may each be a flexible type PCB using polyimide or a rigid type PCB using FR4 or BT resin, or other suitable non-conductive substrate that includes electrically conductive features.

In one embodiment, the processor 102 and memory 104 of LED controller 100 are part of a single integrated circuit. Examples of integrated circuit components include but are not limited to: logic, analog circuitry, sensor, a MEMS device, MOSFET devices, a standalone discrete device such as a resistor, inductor, capacitor, diode, power transistor, a combination of the integrated circuit component types listed above, or may be another type of microelectronic component. The circuitry described herein (such as the processor circuitry and memory circuitry) may be implemented on a semiconductor substrate, which can be any semiconductor material or combinations of materials, such as gallium arsenide, silicon germanium, silicon-on-insulator (SOI), silicon, monocrystalline silicon, the like, and combinations of the above.

In some embodiments, the matrix LED controller system 1300 is implemented as a headlight system for an automobile, where the matrix LED display 1304 (which includes LED1-LED N from FIG. 1) implements one or more headlights, indicator lights, or other lighting displays on the automobile. In such embodiments, the central LED microcontroller 1308 may also be communicatively coupled to an automotive central processing unit (CPU) 1312 via another communication bus 1314. In some embodiments, communication bus 1314 may also be a CAN bus or other suitable high-speed serial interface. In some embodiments, central LED microcontroller 1308 may be communicatively coupled to multiple instances of LED controller 100 (e.g., 32 LED controllers, which control a total of 384 channels), where each LED controller 100 is communicatively coupled to a respective matrix LED display 1304. In such embodiments, the multiple LED controllers 100 may be coupled to the central LED microcontroller 1308 via the same communication bus 1310. In some embodiments, the multiple LED controllers 100 may be coupled to the central LED microcontroller 1308 via multiple communication buses 1310.

The central LED microcontroller 1308 is configured to coordinate overall light output by the matrix LED displays 1304 via each LED controller 100. As noted above, the light output of an LED is controlled by a PWM signal that is generated based on a sequence of light intensity values. If the central LED microcontroller 1308 were configured to directly provide the light intensity values for each channel (e.g., provide light intensity values to 32 LED controllers for 384 channels), such a scenario would require an exceedingly large bandwidth over the communication bus 1310. As an example, providing a light intensity value having a 12 bit brightness resolution to each of 384 channels at an update rate according to the PWM frequency (such as 200 Hz, where a new light intensity value is provided every 5 ms) requires a bandwidth of at least 921.6 kbit/sec. The required bandwidth doubles to 1.843 Mbit/sec for an update rate of a PWM frequency of 400 Hz. Further, this bandwidth is calculated for a basic data rate, without address bits and error reduction bits. A real-world required bandwidth may be up to three times larger than the basic data rate, while the maximum data rate of an automotive qualified CAN interface is 1 Mbit/sec.

To minimize the required bandwidth, each LED controller 100 is configured to store a set of light output curve profiles locally in MTP memory 104, which are used to generate the light intensity values locally. Each of the light output curve profiles (also referred to as PWM curve profiles) includes information that represents a respective PWM curve, as further discussed below in connection with FIG. 2. Each light output curve profile is associated with a unique curve profile identifier (ID), where the central LED microcontroller 1308 would provide a particular curve profile identifier (ID) to each LED controller 100 to indicate which light output curve profile to utilize (e.g., if 8 profiles stored, an ID that is at least 3 bits wide would be transmitted to each LED controller 100 each time the light output curve needed to be implemented). An advantage of storing the curve profiles locally on the LED controller 100 is that a much smaller amount of data needs to be communicated between the central LED microcontroller 1308 and the LED controllers 100 over the communication bus 1310, resulting in a dramatically reduced data rate when compared with a system that transmits each light intensity value for each channel.

Figure 2:
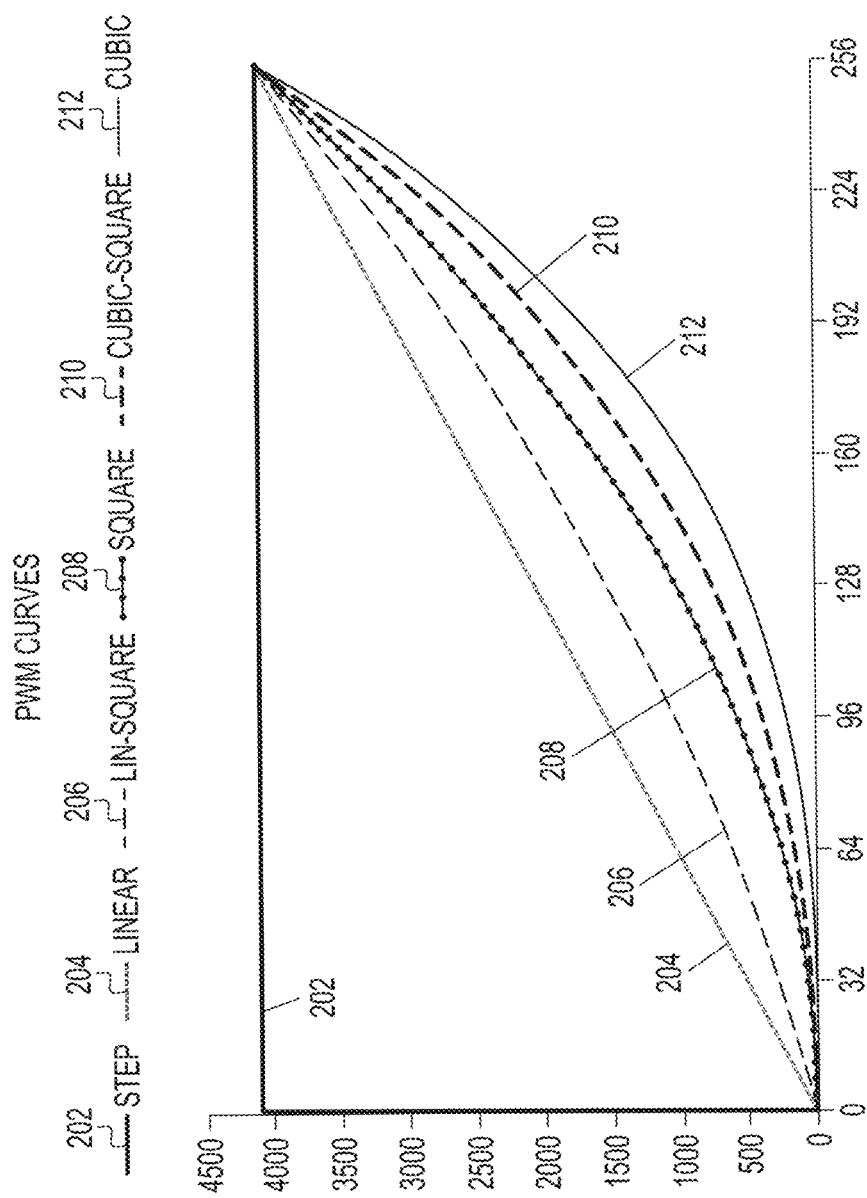
FIG. 2 illustrates example pulse width modulation (PWM) curves for implementing PWM signals to control LEDs, according to some embodiments.

FIG. 2 illustrates example pulse width modulation (PWM) curves used to implement PWM signals for controlling the brightness of the light output of one or more LEDs. As noted above, each PWM curve is a light output curve, which describes a sequence of brightness levels of the light output of an LED (or light intensity values) over some amount of time.

The vertical axis of FIG. 2 represents brightness or light intensity levels. In the embodiment shown, a 12 bit resolution is implemented, achieving a maximum light intensity value of 4096. A light intensity value of 0 indicates a light output of 0% brightness (or full dark) and a light intensity value of 4096 indicates a light output of 100% brightness (or full light). The horizontal axis of FIG. 2 is divided into 256 steps (for an 8 bit step resolution) identified by a sequential set of index numbers, where a light intensity value corresponds to each index number, although a different number of steps (or step resolution) may be implemented in other embodiments. In other words, each PWM curve can be represented by a sequence of 256 light intensity values.

As also noted above, a voltage level corresponding to each light intensity value is output at an update rate determined by the PWM frequency. In this manner, the index numbers also represent (uniform) units of time, based on the period of the PWM frequency. For example, for a PWM frequency of 200 Hz, a light intensity value is output every 5 ms, indicating the PWM curve is completed after 256 steps×5 ms=1.28 sec. For a PWM frequency of 400 Hz, each unit of time represents 2.5 ms, indicating the PWM curve is completed after 256 steps×2.5 ms=0.64 sec.

The example PWM curves shown in FIG. 2 include:
a step function 202, which may also be referred to as immediately ON;
a linear function 204, which may have a constant or linearly increasing duty cycle;
a linear-square function 206;
a square function 208;
a cubic-square function 210; and
a cubic function 212.

It is noted that any shaped light output curve is possible if the entire sequence of 256 light intensity values are stored in local memory. However, storage of such a curve (utilizing a brightness resolution of 12 bits) would require 12 bits×256 light intensity values=3072 bits per curve. To store 8 curves, a total number of 8×3072 bits=24576 bits or 3 Kb is needed.

Each PWM curve can be described by a polynomial function, where the light intensity values of the PWM curve are defined as a function of the index number. A generic equation of the polynomial function is provided as:

$$PWM(x) = Ax^3 + Bx^2 + Cx + D \qquad \text{Eq. 1}$$

Differently-shaped PWM curves are described by the polynomial function implementing different values of polynomial coefficients A, B, C, and D. In other words, each PWM curve can be represented by a different set of coefficients. In the embodiments described herein, the polynomial function may be up to and including a third-order polynomial, also referred to as the polynomial function having a polynomial degree of three or less, which adequately describes a PWM curve for 12 bit brightness resolution.

To reduce the amount of storage space needed to implement a light output curve, the LED controller 100 is configured to locally store a set of four polynomial coefficients, A, B, C, and D, which represent the light output curve or PWM curve. The coefficients are stored as part of the PWM curve profile for the PWM curve in MTP memory 104, where each coefficient is 12 bits wide. Storage of such a PWM curve profile would require 12 bits×4 coefficients=48 bits or 6 bytes. For 8 curve profiles, a total number of 8×48 bits=384 bits or 48 bytes is stored in MTP memory 104, which is a significant reduction of required storage space by a factor of 64.

It is noted that a scaling or shift parameter S is also implemented herein, which is used to scale the PWM curve in the horizontal direction, or change the total number of steps over which the PWM curve extends:

$$PWM(x) = A\frac{x^3}{S^3} + B\frac{x^2}{S^2} + C\frac{x}{S} + D \qquad \text{Eq. 2}$$

Figure 3A:
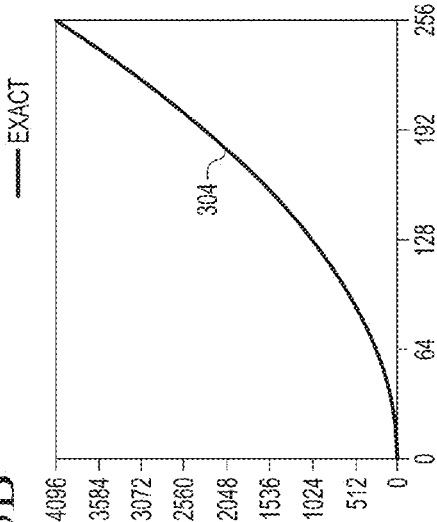
FIGS. 3A, 3B, and 3C illustrate example PWM curves implemented using absolute value and incremental value calculations, according to some embodiments.

For example, a scaling parameter S=256 (indicating 256 steps) is used as a default for the PWM curves shown in FIG. 2. An implementation of a PWM curve having a scaling parameter S=128 is shown in FIG. 3A, with a side-by-side comparison of another implementation of the same PWM curve having a scaling parameter S=256 shown in FIG. 3B. The scaling parameter S=128 is half as large as the default value of S=256, indicating that the PWM curve in FIG. 3A extends over half as many steps as the PWM curve in FIG. 3B. In other words, the curve 302 shown in FIG. 3A can be described with a fewer number of light intensity values, as compared with the number of light intensity values that describe the curve 304 in FIG. 3B (e.g., 128 light intensity values describing curve 302, compared with 256 light intensity values describing curve 304). In the embodiment shown, the last light intensity value may continue to be provided for the remainder of the (default) 256 steps, although a different light intensity value may be provided in other embodiments.

Figure 3B:
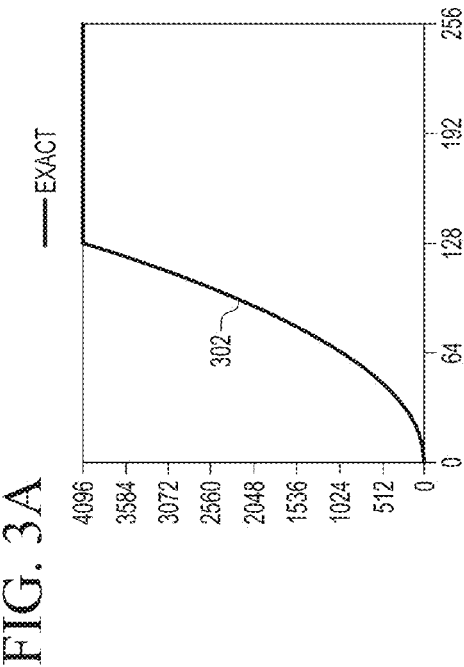

An S parameter that is smaller (e.g., S=128) than the default S parameter indicates that the PWM curve is divided into a smaller number of steps (e.g., scales down the PWM curve), where the PWM curve can be described by a fewer number of light intensity values (e.g., half as many values). Since the light intensity values of the PWM curve are sequentially provided at the update rate defined by the PWM frequency, the completion time of the PWM curve is decreased (e.g., the PWM curve is output faster). For example, the S parameter of 128 indicates that the PWM curve in FIG. 3A is completed over 128 steps, which results in a completion time of 128 steps×5 ms=0.64 sec (for a PWM frequency of 200 Hz). By contrast, the PWM curve in FIG. 3B is completed over 256 steps, which is equivalent to 256 steps×5 ms=1.28 sec. Example values of the S parameter include 256, 128, 64, 32, 16, 8, 4, and 2, where the S parameter can be indicated by a 3 bit wide value to select one of the 8 options. In the embodiments discussed herein, a maximum value of the S parameter is 256, although different maximum values may be utilized in other embodiments (e.g., a maximum value of 512 or 1024, which would require a 4 bit wide value to select one of the 9 or 10 options).

The parameters discussed herein (including the S parameter and the set of coefficients that represent a selected PWM curve) may be changed in an "on-the-fly" or dynamic manner, in response to one or more indications from the automotive CPU 1312. Returning to FIG. 13, the automotive CPU 1312 is configured to detect and monitor driving conditions and hazards, such as detection of changes in weather (e.g., rain or snow conditions) that may affect traction of the automobile, detection of oncoming vehicles, detections of changes in velocity and acceleration, and the like. The automotive CPU 1312 is also configured to make decisions regarding the light output of the matrix LED display 1304 based on some of the detected driving conditions and hazards, such as a decision to turn on LEDs in the matrix LED display 1304 in response to rain on the windshield (or in response to a light detector indicating ambient light levels are dark enough to require headlights), a decision to dim the matrix LED display 1304 in response to an oncoming vehicle, dim the headlights to avoid blinding the oncoming driver), a decision to change an output speed of the matrix LED display 1304 in response to a change in acceleration of the automobile (e.g., increase the output speed of the PWM curve of a turn indicator when the automobile is turning, such as when implementing a wiping effect), and the like. The automotive CPU 1312 may provide an indication of such decisions to the central LED microcontroller 1308 in an on-the-fly manner.

In response to an indication received from the automotive CPU 1312, the central LED microcontroller 1308 may select a PWM curve to be implemented by one or more LEDs of the matrix LED display 1304 and transmit a corresponding PWM curve ID to one or more affected LED controllers 100. The central LED microcontroller 1308 may also transmit (alone or together with the PWM curve ID) a scaling parameter S (also referred to herein as a shift parameter S) based on the received indication to each affected LED controller 100, which may alter how the PWM curve is implemented at the matrix LED display 1304. In some embodiments, the automotive CPU 1312 itself provides the scaling parameter as the indication to the central LED microcontroller 1308. The processor 102 of each LED controller 100 implements processing logic configured to receive the PWM curve ID, retrieve a PWM curve profile associated with the PWM curve ID from local memory, and initialize the calculators with a set of coefficients from the retrieved PWM curve profile. The processing logic is also configured to receive an S parameter indication and initialize the calculators with the selected S parameter. The processing logic is also configured to output one or more voltage levels to the PWM generators based on each light intensity value output by the calculators, which are used to generate PWM signals that implement the PWM curve at the matrix LED display. The calculators are further discussed below.

Since the light intensity values are calculated by each LED controller 100 in an "on-demand" manner in response to the parameters (e.g., the set of coefficients, the S parameter, or both) received from the central LED microcontroller 1308, one challenge to changing the parameters on-the-fly is that switching from one parameter to another parameter may introduce large discontinuities in the calculated light intensity values of the PWM curve, depending on the calculation method used to determine the light intensity values. Discontinuities that are large enough (e.g., a difference between a present light intensity value and a previous light intensity value is larger than a threshold change of 5% brightness level, or greater than a threshold delta value of 200) may be detected as flicker by the human eye, which is undesirable.

Light intensity values of a PWM curve may be calculated using absolute value calculations or incremental value calculations. Absolute value calculations involve calculating each light intensity value according to the polynomial function provided above as Equation 2, where each light intensity value is calculated independently of other light intensity values on the PWM curve. Incremental value calculations involve calculating each light intensity value according to a derivative of the polynomial function of Equation 2, where each subsequent light intensity value is calculated as a differential value or an incremental value dependent upon a previously calculated light intensity value. Example implementations of a PWM curve using absolute value and incremental value calculations are shown in FIG. 3C.

Figure 3C:
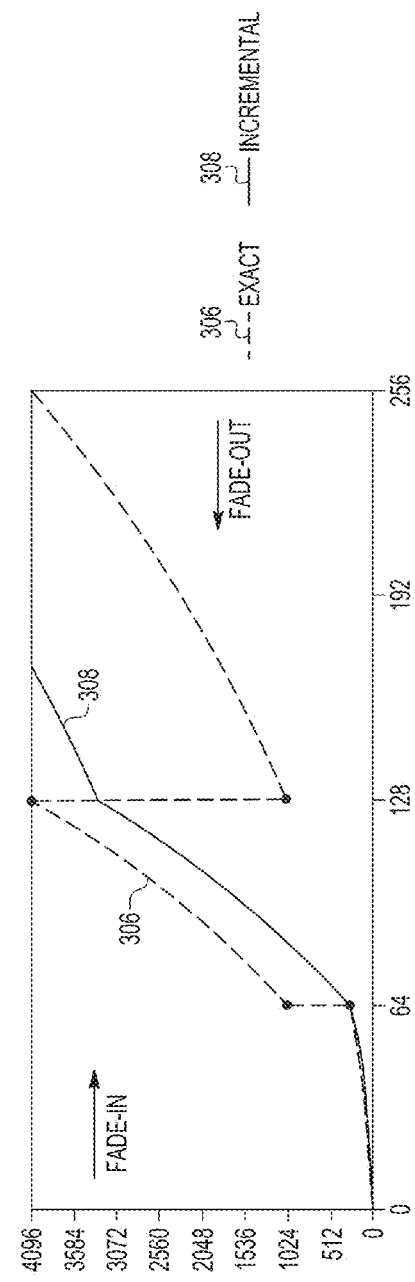

As shown in FIG. 3C, curve 306 is an implementation of a PWM curve (like that shown in FIG. 3B) using absolute value calculations to calculate light intensity values, and curve 308 is another implementation of the same PWM curve using incremental value calculations to calculate light intensity values. For both curves 306 and 308, the light intensity values are calculated in a sequential manner from index number 0 up to index number 256. For both curves 306 and 308, the S parameter is initially set (e.g., by default) to 256, and changed to 128 at a time corresponding to index number 64, and changed back to 256 at a time corresponding to index number 128. As noted above, the S parameter indicates a number of steps or index numbers over which the PWM curve extends.

As shown on curve 306, a large discontinuity or jump occurs between the light intensity value calculated immediately before the change time at index number 63 and the light intensity value calculated after the change time at index number 64. Similarly, another large discontinuity occurs between the light intensity value calculated immediately before the change time at index number 127 and the light intensity value calculated after the change time at index number 128. These discontinuities are large enough to be detected as flicker, and are undesirable. By contrast, incremental value calculations obtain a difference or differential value that reflects the rate of change introduced by the changed parameters, which is incorporated into the implemented curve 308 dynamically to produce a smoother curve 308 without discontinuities. For example, the slope of the curve segment between index numbers 64 and 128 of both curves 306 and 308 are the same, and the slope of the curve segment between index numbers 128 and 256 of both curves 306 and 308 are the same, indicating that the same rate of change introduced by the changed parameters is implemented in curves 306 and 308, but curve 308 does not include the discontinuities present on curve 306. In other words, the absolute value calculations provide a non-continuous curve, and the incremental value calculations provide a continuous curve. No additional complex calculations are required to provide smoother curve 308.

It is noted that light intensity values calculated based on the PWM curve shown in FIG. 3B start at a small light intensity value at index number 0 and end at a larger light intensity value at index number 256. Such a PWM curve implements a fade-in effect, where the brightness of the light output of the LED is increasing over time. The same PWM curve can also be used to implement a fade-out effect, where the brightness of the light output of the LED is decreasing over time. For example, the light intensity values calculated based on the PWM curve in FIG. 3B start at a large light intensity value at index number 256 and end at a smaller light intensity value at index number 0. In other words, the light intensity values can be provided in a sequence order according to increasing index numbers to implement a fade-in effect (as indicated in FIG. 3C by the directional arrow pointing from left to right, labeled FADE-IN), and can be provided in a reverse sequence order according to decreasing index numbers to implement a fade-out effect (as indicated in FIG. 3C by the directional arrow pointing from right to left, labeled FADE-OUT). In some embodiments, a directional indicator may be provided by the central LED microcontroller 1308 to each LED controller 100 to indicate whether a selected PWM curve should be used to implement a fade-in effect or a fade-out effect at the LEDs.

It is also noted that a portion of the selected PWM curve can be used to control the light output at an LED. For example, in some embodiments, the central LED microcontroller 1308 may also provide a start index number, a stop index number, or both, to indicate the portion of the PWM curve that should be used (e.g., the portion of the PWM curve between index numbers 64 and 128). Otherwise, a default start index number of 0 (or minimum step number) and a default stop index number of 256 (or maximum step number) is used herein for fade-in incremental calculations, and a default start index number of 256 and a default stop index number of 0 is used herein for fade-out incremental calculations.

Figure 4:
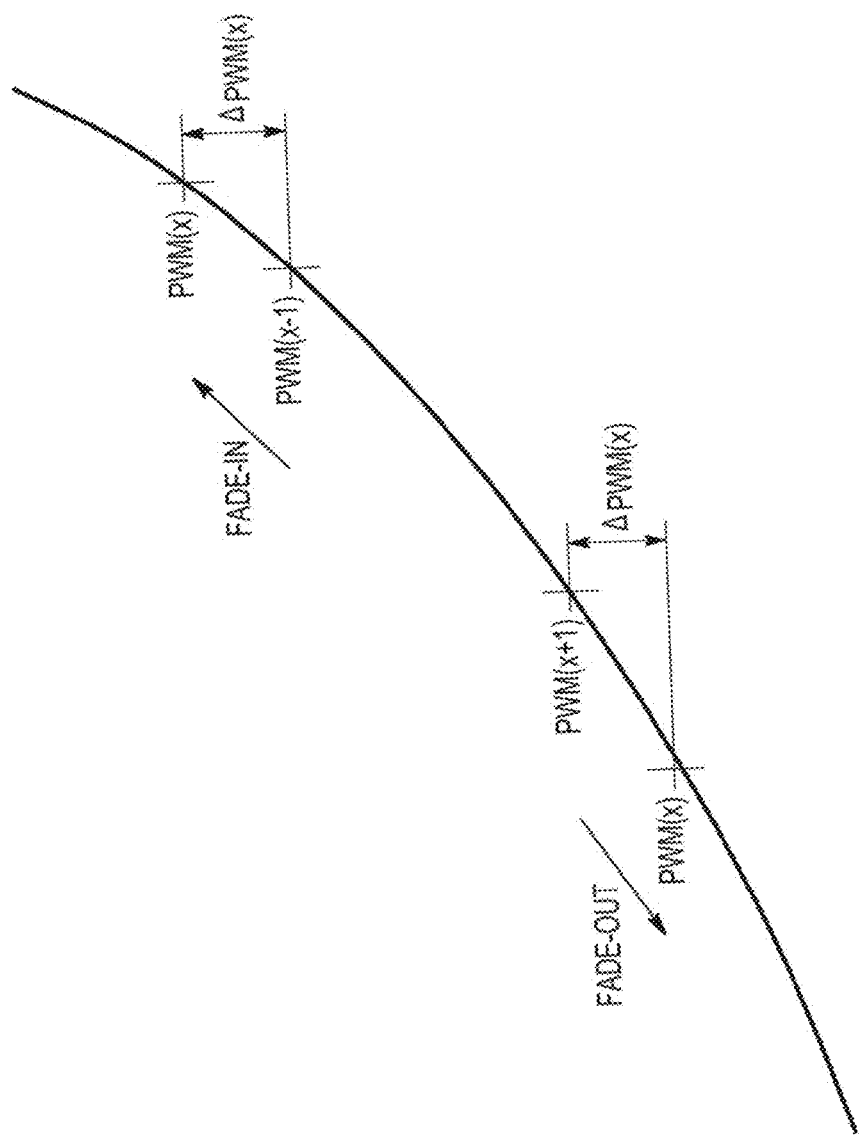
FIG. 4 illustrates a plot diagram depicting an example fade-in incremental calculation and an example fade-out incremental calculation, according to some embodiments.

FIG. 4 illustrates a plot diagram depicting an example fade-in incremental calculation and an example fade-out incremental calculation in relation to points (or light intensity values) on an example PWM curve. A fade-in effect is shown at the top right of FIG. 4, where the start point of the curve is lower than the stop point of the curve, following the curve from left to right (as indicated by the directional arrow pointing from left to right, labeled FADE-IN). An incremental or delta value, shown as ΔPWM(x), can be calculated and added to a previous point on the curve, shown as PWM(x−1), which results in a next point on the curve, shown as PWM(x). In other words, a present light intensity value PWM(x) that is determined by a fade-in incremental calculation is provided as:

PWM(x)=PWM(x−1)+ΔPWM(x)   Eq. 3 (Fade-in)

A fade-out effect is shown at the bottom left of FIG. 4, where the start point of the curve is higher than the stop point of the curve, following the curve from right to left (as indicated by the directional arrow pointing from right to left, labeled FADE-OUT). An incremental or delta value, shown as ΔPWM(x), can be calculated and subtracted from a previous point on the curve, shown as ΔPWM(x+1), which results in a next point on the curve, shown as PWM(x). In other words, a present light intensity value PWM(x) that is determined by a fade-out incremental calculation is provided as:

PWM(x)=PWM(x+1)−ΔPWM(x)   Eq. 4 (Fade-out)

In order to achieve smoother light output curves at the LEDs, each LED controller 100 implements polynomial calculators that implement the polynomial function using incremental value calculations. In the approach described herein, a starting or initial light intensity value corresponding to the start index number needs to be calculated using an absolute value calculation, while the subsequent light intensity values are calculated using incremental value calculations. An example absolute value calculator is discussed below in connection with FIG. 8, and example incremental value calculators are discussed below in connection with FIG. 9-12.

As described herein, an absolute value calculator is a digital implementation (e.g., digital circuitry using MOSFET technology) of Equation 2 provided above, reproduced here:

$$PWM(x) = A\frac{x^3}{S^3} + B\frac{x^2}{S^2} + C\frac{x}{S} + D \qquad \text{Eq. 2 (Absolute)}$$

It is noted that a direct implementation of Equation 1 would multiply A by $x^3$, where A is 12 bits wide and x (as the index number) is 8 bits wide, requiring 12 bits+3(8 bits)=36 bits. Dividing $x^3$ by $S^3$ (where the S value is also 8 bits wide) in Equation 2 reduces the required bits down to 12 bits.

An incremental value calculator is a digital implementation of a derivative of Equation 2. A basic derivative is provided as:

$$\Delta PWM(x) = 3A\frac{x^2}{S^3} + 2B\frac{x}{S^2} + \frac{C}{S} \qquad \text{Eq. 5 (Incremental)}$$

Equation 5 is for a time-continuous implementation, but the present disclosure provides a time-discrete implementation. The discrete differentiation is provided as Equation 6 for fade-in incremental value calculations and Equation 7 for fade-out incremental value calculations. The relationships between the various terms of Equations 6 and 7 are shown in FIG. 4 and discussed above.

ΔPWM(x)=PWM(x)−PWM(x−1)   Eq. 6 (Fade-in)

ΔPWM(x)=PWM(x+1)−PWM(x)   Eq. 7 (Fade-out)

Equation 6 can also be written as Equation 8, and Equation 7 can also be rewritten as Equation 9:

$$\Delta PWM(x) = 3A\frac{x^2}{S^3} + \left(2D - \frac{3A}{S}\right)\frac{x}{S^2} + \left(C - \frac{B}{S} + \frac{A}{S^2}\right)\frac{1}{S} \qquad \text{Eq. 8 (Fade-in)}$$

$$\Delta PWM(x) = 3A\frac{x^2}{S^3} + \left(2B + \frac{3A}{S}\right)\frac{x}{S^2} + \left(C + \frac{B}{S} + \frac{A}{S^2}\right)\frac{1}{S} \qquad \text{Eq. 9 (Fade-out)}$$

As compared to the coefficients 2B and C of the time-continuous implementation of Equation 5, Equation 8 and Equation 9 changes 2B to a coefficient of (2B±3A/S), and changes C to a coefficient of (C±B/S+A/$S^2$). An incremental value calculator implementing Equation 8 may be chosen when a fade-in effect is desired, and an incremental value calculator implementing Equation 9 may be chosen when a fade-out effect is desired.

In order to reduce the number of multiplications used in the absolute value calculator and the incremental value calculators, Horner's method is used to rewrite Equations 2, 8, and 9 in a recursive manner as Equations 10, 11, and 12, which allows a more efficient implementation in hardware (e.g., hardware is reused) and reduce the physical size of the logic:

$$PWM(x) = ((Ax/S+B)x/S+C)x/S+D \quad \text{Eq. 10 (Absolute)}$$

$$\Delta PWM(x) = \{[3Ax+(2BS-3A)]x/S+(CS-B+A/S)\}\,1/S \quad \text{Eq. 11 (Fade-in)}$$

$$\Delta PWM(x) = \{[3Ax+(2BS+3A)]x/S+(CS+B+A/S)\}\,1/S \quad \text{Eq. 12 (Fade-out)}$$

Figure 5:
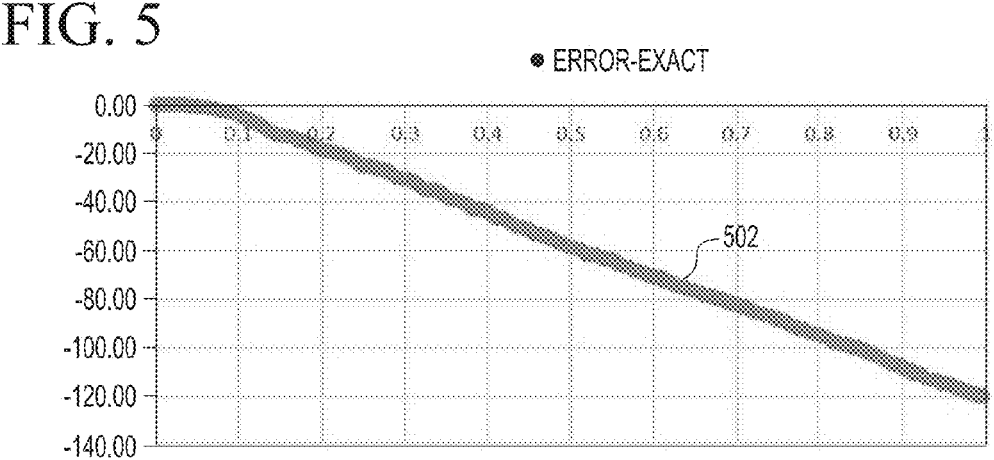
FIGS. 5, 6, and 7 illustrate plot diagrams of error according to various incremental calculation resolutions, according to some embodiments.

It is noted that straightforward calculator implementations of Equations 10, 11, and 12 results in a great deal of error. FIG. 5 illustrates an example error plot graph 502 that includes error values calculated using an implementation of an absolute value calculator and an incremental value calculator for a polynomial function having the coefficients A=4096, B=0, C=0, and D=0. As shown in FIG. 5 (and FIGS. 6 and 7), the horizontal scale is relative to the maximum index number of 256 and the vertical scale indicates an amount of error. A large error is shown as a function of x (or index number) when performing calculations using a standard calculation width of 12 bits. For example, the amount of error increases as the index number becomes larger (e.g., each iteration introduces additional error). The error is caused by the limited accuracy of the digital calculations. Such error can be greatly reduced by increasing the calculation width by 8 bits, as shown in FIG. 6.

Figure 6:
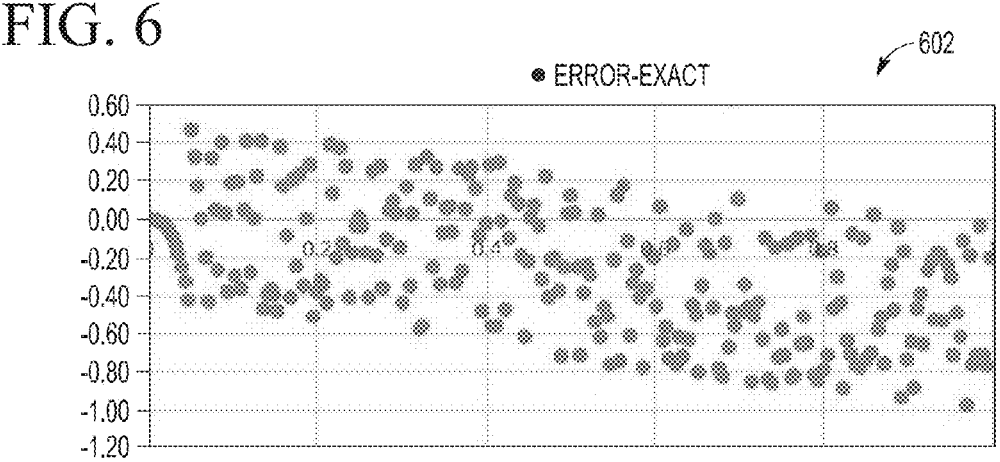

FIG. 6 illustrates an example error plot graph 602 that includes error values calculated for an implementation of an incremental calculator for the same polynomial function, which shows a smaller error as a function of x when performing calculations using a calculation width of 20 bits. The maximum error is now only within 1 least significant bit (LSB), but a trend is visible in FIG. 6 due to all digital intermediate calculation results being truncated instead of rounded, which gives a systematic error of 0.5 LSB per index number. Such error can be further reduced by adding 0.5 LSB to the calculations, or S/2, which increases the average step size and rounds (instead of truncates) the calculated values to minimize the accumulating error, as shown in FIG. 7.

Figure 7:
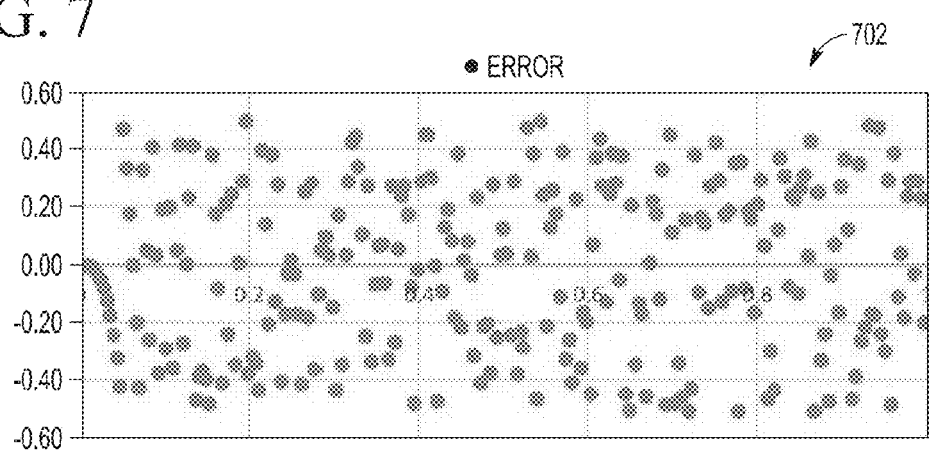

FIG. 7 illustrates an example error plot graph 702 that includes error values calculated for an implementation of an incremental calculator for the same polynomial function, which shows an even smaller error as a function of x when performing incremental calculations using a calculation width of 20 bits and rounding intermediate calculation results, rather than truncation. As shown, the error is not more than 0.5 LSB.

Including the error correction term S/2, equations 10, 11, and 12 can be rewritten as Equations 13, 14, and 15 (where Equation 13 is also shown in a further factored form, in a manner similar to Equations 14 and 15):

$$PWM(x) = \{(Ax+BS)x/S+CS)x/S+DS+S/2\}\,1/S \quad \text{Eq. 13 (Absolute)}$$

$$\Delta PWM(x) = \{[3Ax+(2BS-3A)]x/S+(CS-B+A/S+S/2)\}\,1/S \quad \text{Eq. 14 (Fade-in)}$$

$$\Delta PWM(x) = \{[3Ax+(2BS+3A)]x/S+(CS+B+A/S+S/2)\}\,1/S \quad \text{Eq. 15 (Fade-out)}$$

It is noted that there is still a problem with this implementation. As discussed above, the light output curve is divided into 256 steps, where a maximum light intensity value of 4096 is reached at the final index number of 256. However, an 8 bit wide counter would only provide index numbers from 0 to 255. The 255th light intensity value would be 4047 (according to the example of the polynomial function implemented by coefficients A=4096, B=0, C=0, and D=0), which is less than the maximum available light intensity value available when implementing 12 bit light intensity resolution. To compensate, the incremental value calculators include an additional step normalization factor based on a fixed 256 steps (rather than on S). The factor 256/S (which is the maximum number of steps divided by S) is included in the incremental value calculations defined by Equations 14 and 15, which is multiplied by the already-present 1/S term and shown as 256/S² in Equations 16 and 17. As further shown in the calculators in FIGS. 9 and 10, the final sum is also divided by a fixed 256 to complete normalization and output the calculated light intensity value.

$$\Delta PWM(x) = \left\{[3Ax+(2BS-3A)]\frac{x}{S}+\left(CS-B+\frac{A}{S}+\frac{S}{2}\right)\right\}\frac{256}{S^2} \quad \text{Eq. 16 (Fade-in)}$$

$$\Delta PWM(x) = \left\{[3Ax+(2BS+3A)]\frac{x}{S}+\left(CS+B+\frac{A}{S}+\frac{S}{2}\right)\right\}\frac{256}{S^2} \quad \text{Eq. 17 (Fade-out)}$$

Figure 9:
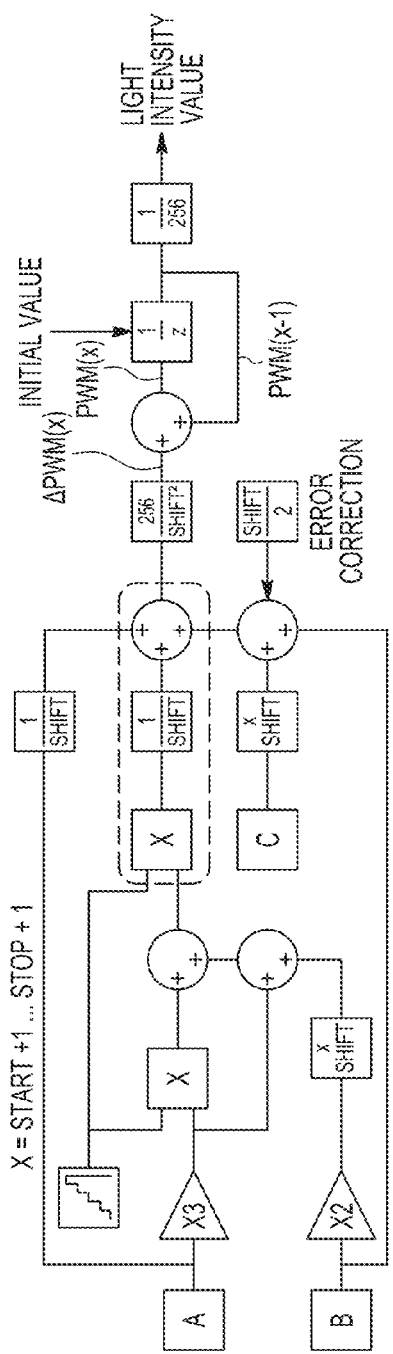
FIG. 9 and FIG. 11 are block diagrams illustrating relevant components of example fade-in incremental value calculators based on a differential of a polynomial function for calculating incremental values to produce subsequent light intensity values of a PWM curve, according to some embodiments.
Figure 10:
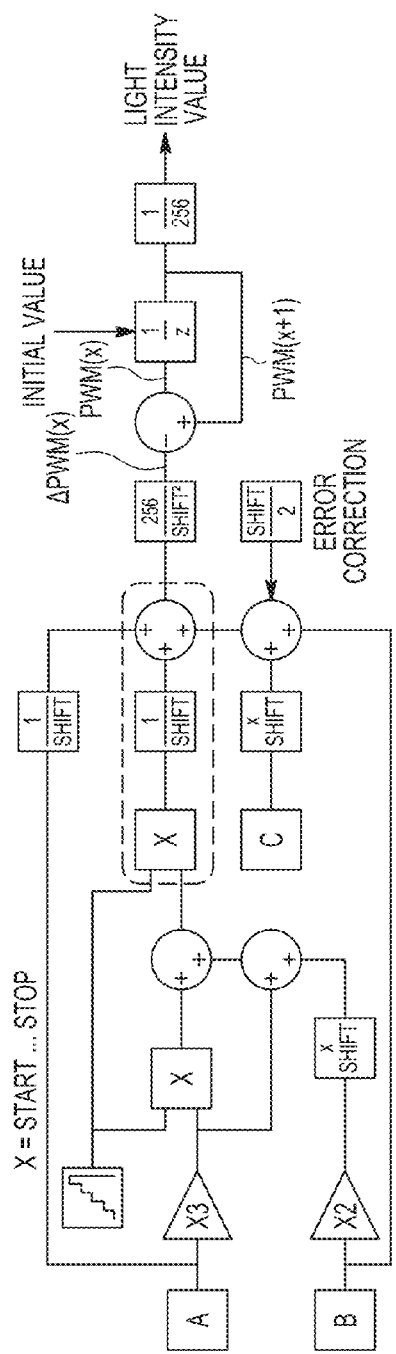
FIG. 10 and FIG. 12 are block diagrams illustrating relevant components of an example fade-out incremental value calculators based on recalculated versions of a differential of a polynomial function for calculating incremental values to produce subsequent light intensity values of a PWM curve, according to some embodiments.

The index numbers used by the calculators in FIGS. 9 and 10 are also adjusted in order to compensate for an offset introduced into the calculations by 256/SHIFT², which achieves the full light intensity resolution at the final index number. For example, a set of index numbers, which begin at a START value and end at a STOP value that is greater than the START value, are offset by one before being used by the fade-in calculator of FIG. 9 in order to reach a 100% light intensity level at the maximum available step of 256. By contrast, the fade-out calculator of FIG. 10 uses the set of index numbers without the offset, which begin at a START value and end at a STOP value that is less than the START value. The absolute value calculation of the initial light intensity value also needs to be adjusted in order to take this offset into account, as further discussed below.

It is noted that, as shown in FIG. 4, the delta value $\Delta PWM(x)$ is either added to or subtracted from one point to produce a next point, depending on whether a fade-in incremental value calculation or a fade-out incremental value calculation is selected. In other words, both the fade-in calculator and the fade-out calculator may determine the delta value $\Delta PWM(x)$ based on Equation 17 (e.g., an implementation based on Equation 16 would require subtraction, which may require additional circuitry such as inverters, as compared with an implementation based on Equation 17).

An absolute value calculator based on Equation 13 is discussed below in connection with FIG. 8, a fade-in incremental value calculator based on Equation 17 is discussed below in connection with FIG. 9, and a fade-out incremental value calculator also based on Equation 17 is discussed below in connection with FIG. 10. The fade-in and fade-out incremental value calculators of FIGS. 9 and 10 implement smooth light output curves at the LEDs when parameters (like the coefficients, the S parameter, or both) are changed on-the-fly, where the incremental value calculators change the slope of the implemented light output curve rather than independently calculate each light intensity value. Alternative embodiments of a fade-in and fade-out incremental value calculator based on recalculated versions of Equation 14 and 15 (to achieve 100% brightness at index number 255) are also provided in FIGS. 11 and 12. Such calculators are simplified implementations and may not provide a solution as robust as the calculators in FIGS. 9 and 10.

Figure 8:
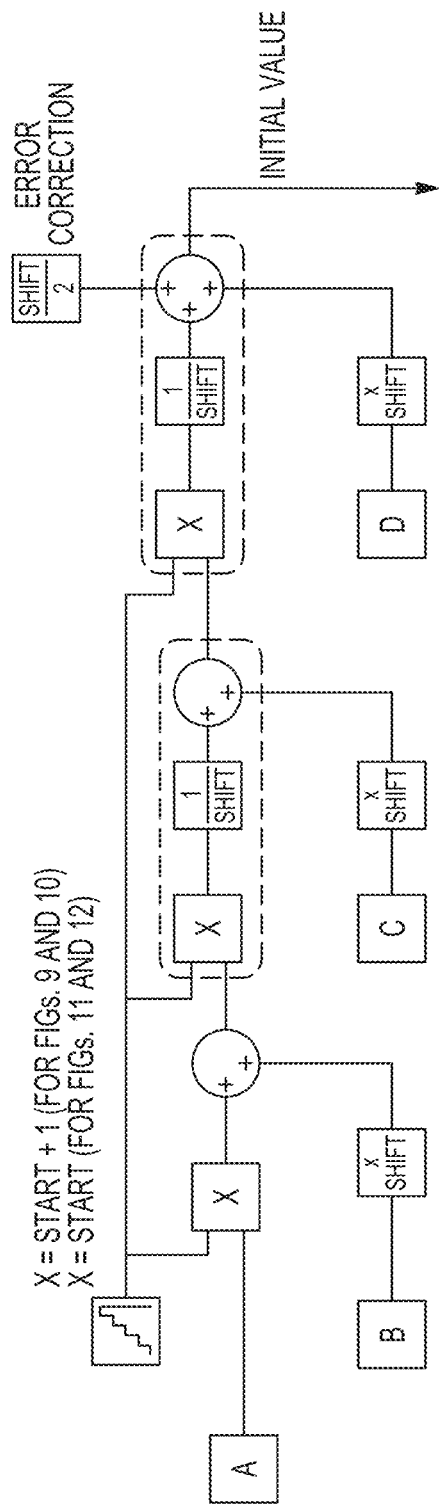
FIG. 8 is a block diagram illustrating relevant components of an example absolute value calculator based on a polynomial function for calculating an initial light intensity value of a PWM curve, according to some embodiments.

FIG. 8 is a block diagram illustrating relevant components of an example absolute value calculator based on a polynomial function (shown in Equation 13) for calculating an initial light intensity value of a PWM curve. A number of symbols are used in the diagrams of FIG. 8-12. For example, a box labeled with a stair-stepping curve implements a free-running counter that provides a sequential set of index numbers by incrementing (or decrementing) a present index number to produce a subsequent index number. For example, for an 8 bit wide index number, the counter sequentially outputs the integers of 0 to 255 in either an increasing order or decreasing order, based on the directional indicator. In embodiments where the absolute value calculator is used to calculate every light intensity value, the free-running counter is configured to increment the index numbers at the PWM frequency (e.g., may be configured to receive the OSC signal that is also provided to the PWM generators of FIG. 1). However, in the present example, the absolute value calculator of FIG. 8 is only used to calculate an initial light intensity value for an initial index number that is referred to herein as the START index number. As such, the free-running counter of FIG. 8 may be alternatively implemented as a register that stores the START index number. It is noted that START and STOP index numbers (ranging from 0 to 255, although other ranges may be utilized in other embodiments) may be provided by the central LED microcontroller in some embodiments, or may be set to default START and STOP values, depending on whether a fade-in or fade-out effect is being implemented. For example, if a fade-in effect is indicated, a default START value of 0 and a default STOP value of 255 may be used, while if a fade-out effect is indicated, a default START value of 255 and a default STOP value of 0 may be used.

The absolute value calculator provided in FIG. 8 may be utilized with the incremental value calculators of FIGS. 9 and 10 in some embodiments, or may be utilized with the incremental value calculators of FIGS. 11 and 12 in other embodiments, which are further described below. In embodiments where the absolute value calculator is used with the calculators of FIGS. 9 and 10, the initial index number used by the absolute value calculator to calculate an initial light intensity needs to be adjusted, due to the offset introduced into the calculated incremental values by the normalization factor $256/SHIFT^2$ included in the calculators of FIGS. 9 and 10. Such an adjustment can be achieved by adding 1 to the START index number. In other words, the absolute value calculator would perform a calculation at START+1, instead of at START (which is labeled as "X=START+1 for FIGS. 9 and 10"). It is noted that to implement this adjustment, one skilled in the art would understand that the START index number would be incremented to START+1 by the counter, or an additional adder that adds an integer 1 to the START index number would be included. In embodiments where the absolute value calculator is used with the calculators of FIGS. 11 and 12, the initial index number need not be adjusted and remains at START (which is labeled as "X=START for FIGS. 11 and 12").

Circles having a number of internal plus signs represent adders. Blocks labeled with "X" represent a multiplication operation. Blocks labeled "A", "B", "C", and "D" represent the polynomial coefficients (12 bits) and may also be implemented as registers that are initialized with the retrieved set of coefficients of the selected curve profile by processing logic of the LED controller. As noted above, the absolute value calculator of FIG. 8 (and the incremental value calculators of FIGS. 9 and 10) utilizes a calculation width of 20 bits, although other calculation widths may be utilized in other embodiments. Also, as noted above, the absolute value calculator of FIG. 8 (and the incremental value calculators of FIGS. 9 and 10) performs rounding rather than truncation.

Blocks labeled with "1/SHIFT" represent a division operation by the SHIFT parameter (which is referred to as the S parameter above), which is implemented by a bit shifter that shifts bits to the right. For example, dividing a coefficient by a SHIFT value of 256 would require shifting the bits of the coefficient to the right by 8 bits, while a SHIFT value of 128 would require shifting the bits to the right by 7 bits. Blocks labeled with "X SHIFT" represent a multiplication operation by the SHIFT parameter, which is implemented by a bit shifter that shifts bits to the left. For example, multiplying a coefficient by a SHIFT value of 256 would require shifting the bits of the coefficient to the left by 8 bits, while a SHIFT value of 128 would require shifting the bits to the left by 7 bits.

In FIG. 8, coefficient A is multiplied by the START index number (which may be START+1 in some embodiments), and coefficient B is multiplied (or shifted left) by the SHIFT parameter, which are added to produce a first summation (which is the first parenthetical term (Ax+BS) shown above in Equation 13). The first summation is multiplied by the START index number (which may be START+1 in some embodiments) and divided (or shifted right) by the SHIFT parameter, and coefficient C is by the SHIFT parameter, which are added to produce a second summation (which is the second parenthetical term ((Ax+BS) x/S+CS) shown above in Equation 13). The second summation is multiplied by the START index number (which may be START+1 in some embodiments) and divided by the SHIFT parameter, and coefficient D is multiplied by the SHIFT parameter, which are added with an error correction term of SHIFT/2 to produce a third summation (which is the overall bracketed term of Equation 13). The third summation is provided as the initial light intensity value to an incremental value calculator, like those shown in FIG. 9-12.

FIG. 9 is a block diagram illustrating relevant components of an example fade-in incremental value calculator based on a differential of a polynomial function (shown in Equation 17) for calculating incremental values to produce subsequent light intensity values of a PWM curve. The fade-in calculator is selected in response to a received directional indicator from the central LED microcontroller that indicates a fade-in effect is desired. Additional symbols used in FIG. 9 (that are also used in FIG. 10-12) include a triangle labeled with "X3" that multiplies a coefficient by the integer 3, and a triangle labeled with "X2" that multiplies a coefficient by the integer 2. A box labeled "$256/SHIFT^2$" performs both multiplication of an input by the integer 256 and shifts the input to the right twice. A box labeled "1/z" also indicates a memory component, such as a register, that is configured to receive and store the initial light intensity value from the absolute value calculator in FIG. 8.

Since a fade-in effect is selected, the START index number is smaller than the STOP index number. The free-running counter in FIG. 9 provides a set of sequential index numbers by incrementing the next index number (or START+1) up to the STOP index number, which calculates the light intensity values along the PWM curve in a left to right direction. However, in order to compensate for the offset introduced in the fade-in incremental calculator (due to achieving a maximum brightness in 256 steps), the index number needs to reach 256, or STOP+1 (which is labeled as "X=START+1 . . . STOP+1"). It is noted that to implement this adjustment, one skilled in the art would understand that the START index number would be incremented to START+1 by the counter, which would continue incrementing the index number. An additional adder that adds an integer 1 to the index number provided by an 8 bit counter would be included (e.g., the counter provides a set of index numbers from 0 to 255, where 1 is added to each number to produce a set of index numbers from 1 to 256, or START+1 to STOP+1, that are used by the fade-in calculator). In other words, the absolute value calculator of FIG. 8 is configured to calculate an initial light intensity value using a number in the range from 1 to 256, and the fade-in calculator is configured to calculate subsequent light intensity values using a number in the range from 1 to 256.

The fade-in calculator of FIG. 9 begins calculations at the START+1 index number. In FIG. 9, coefficient A is multiplied by 3 and by the present index number, coefficient B multiplied by 2 and by the SHIFT parameter, both of which are added to coefficient A multiplied by 3 to produce a first summation (which is a first bracketed term of [3Ax+(2BS+3A)] of Equation 17). The first summation is multiplied by the present index number and divided by the SHIFT parameter, which is added to coefficient A divided by the SHIFT parameter, coefficient C multiplied by the SHIFT parameter, coefficient B, and an error correction term of SHIFT/2 to produce a second summation (which is the overall bracketed term of {[3Ax+(2BS+3A)]x/S+(CS+B+A/S+S/2)} of Equation 17). The second summation is then multiplied by 256 and divided by SHIFT twice (which is the final term of Equation 17) to produce an incremental value ΔPWM(x).

This incremental value is added to the previously calculated light intensity value PWM(x−1) to produce a presently calculated light intensity value PWM(x). When the index number is START+1 and the calculator of FIG. 9 is performing its first incremental calculation, PWM(x−1) is the initial light intensity value calculated by the absolute value calculator of FIG. 8. After PWM(x) is calculated, the memory component stores PWM(x), which is added to the next incremental value calculation (e.g., when the index number is START+2).

The presently calculated light intensity value PWM(x) is then divided by 256 to produce a normalized version of the light intensity value. In some embodiments, this normalized version of the light intensity value is used to determine the voltage levels output to the PWM generators.

FIG. 10 is a block diagram illustrating relevant components of an example fade-out incremental value calculator based on a differential of a polynomial function (shown in Equation 17) for calculating incremental values to produce subsequent light intensity values of a PWM curve. The fade-out calculator is selected in response to a received directional indicator from the central LED microcontroller that indicates a fade-out effect is desired.

Since a fade-out effect is selected, the START index number is larger than the STOP index number. The free-running counter in FIG. 10 provides a set of sequential index numbers by decrementing the next index number (or START−1) down to the STOP index number, which calculates the light intensity values along the PWM curve in a right to left direction. However, in order to compensate for the offset introduced in the fade-out incremental calculator, the index number needs to run from 255 to 0, or from START to STOP (rather than from START+1 to STOP or from START+1 to STOP+1). This adjustment would be implemented by allowing the counter to decrement from START to STOP (which is labeled as "X=START . . . STOP"). In other words, the absolute value calculator of FIG. 8 is configured to calculate an initial light intensity value using a number in the range from 256 to 1, and the fade-out calculator is configured to calculate subsequent light intensity values using a number in the range from 255 to 1.

The fade-out calculator of FIG. 10 begins calculations at START index number. Since the fade-out calculator of FIG. 10 is based on the same differential equation shown in Equation 17 on which the fade-in calculator of FIG. 9 is based, the fade-our calculator of FIG. 10 has a same structure for calculating the incremental value ΔPWM(x), as described above in connection with FIG. 9.

This incremental value is subtracted from the previously calculated light intensity value PWM(x+1) to produce a presently calculated light intensity value PWM(x). When the index number is START and the calculator of FIG. 10 is performing its first incremental calculation, PWM(x+1) is the initial light intensity value calculated by the absolute value calculator of FIG. 8. After PWM(x) is calculated, the memory component stores PWM(x), which is subtracted from the next incremental value calculation (e.g., when the index number is START−1).

The presently calculated light intensity value PWM(x) is then divided by 256 to produce a normalized version of the light intensity value. In some embodiments, this normalized version of the light intensity value is used to determine the voltage levels output to the PWM generators.

Figure 11:
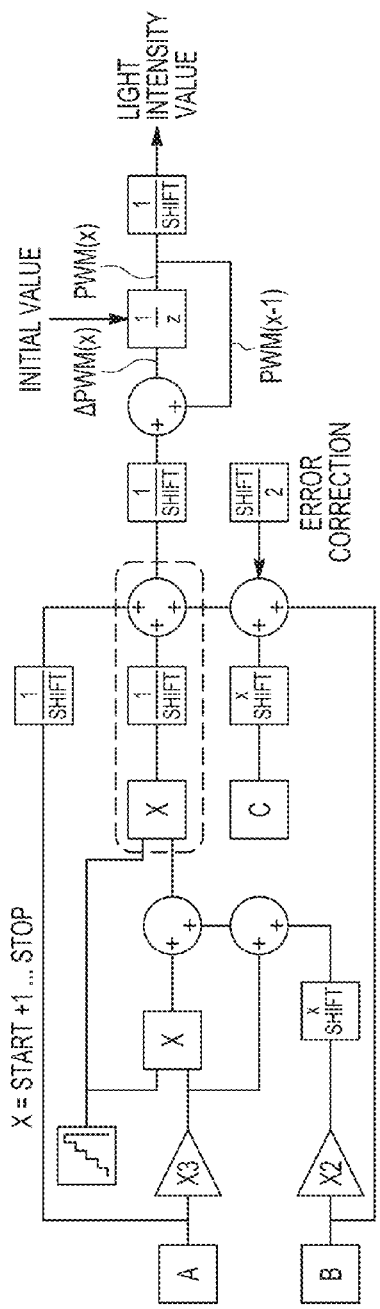

FIG. 11 is a block diagram illustrating relevant components of another example fade-in incremental value calculator based on a recalculated version of a differential of a polynomial function (shown in Equation 14) for calculating incremental values to produce subsequent light intensity values of a PWM curve. It is noted that the implementation of the fade-in calculator of FIG. 11 is a simpler and limited implementation. As such, no normalizing term is included in the calculator of FIG. 11.

Since a fade-in effect is selected, the START index number is smaller than the STOP index number. The free-running counter in FIG. 11 provides a set of sequential index numbers by incrementing the next index number (or START+1) up to the STOP index number, which calculates the light intensity values along the PWM curve in a left to right direction. The index number is iterated up to a maximum 255 STOP value.

The fade-in calculator of FIG. 11 begins calculations at the START+1 index number. In FIG. 11, coefficient A is multiplied by 3 and by the present index number, coefficient B multiplied by 2 and by the SHIFT parameter, both of which are added to coefficient A multiplied by 3 to produce a first summation (which implements a first bracketed term of [3Ax+(2BS+3A)] of a recalculated fade-in incremental value equation). The first summation is multiplied by the present index number and divided by the SHIFT parameter, which is added to coefficient A divided by the SHIFT parameter, coefficient C multiplied by the SHIFT parameter, coefficient B, and an error correction term of SHIFT/2 to produce a second summation (which implements an overall bracketed term of {[3Ax+(2BS+3A)]x/S+(CS+B+A/S+S/2)} of the recalculated fade-in incremental value equation. The second summation is then divided by SHIFT parameter (which implements the recalculated fade-in incremental value equation $\{[3Ax+(2BS+3A)]x/S+(CS+B+A/S+S/2)\}1/S$) to produce an incremental value $\Delta PWM(x)$.

This incremental value is added to the previously calculated light intensity value PWM(x−1) to produce a presently calculated light intensity value PWM(x). When the index number is START+1 and the calculator of FIG. 11 is performing its first incremental calculation, PWM(x−1) is the initial light intensity value calculated by the absolute value calculator of FIG. 8. After PWM(x) is calculated, the memory component stores PWM(x), which is added to the next incremental value calculation (e.g., when the index number is START+2).

The presently calculated light intensity value PWM(x) is then divided by SHIFT and is used to determine the voltage levels output to the PWM generators. Optionally, in other embodiments, a binning circuit may also be included in the calculator of FIG. 11, as described above in connection with FIG. 9.

Figure 12:
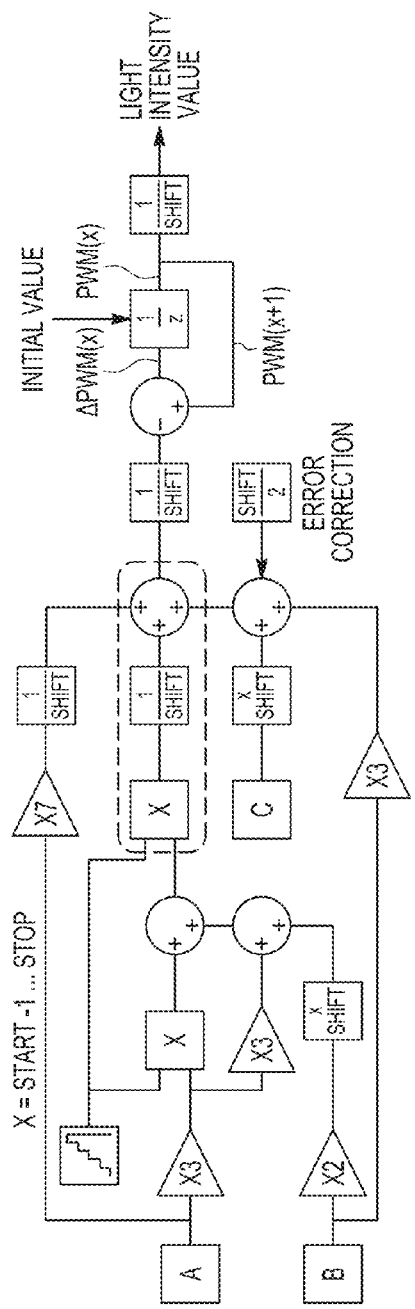

FIG. 12 is a block diagram illustrating relevant components of another example fade-out incremental value calculator based on a recalculated version of a differential of a polynomial function (shown in Equation 15) for calculating incremental values to produce subsequent light intensity values of a PWM curve. It is noted that the implementation of the fade-in calculator of FIG. 11 is a simpler and limited implementation. As such, no normalizing term is included in the calculator of FIG. 12.

Since a fade-out effect is selected, the START index number is larger than the STOP index number. The free-running counter in FIG. 12 provides a set of sequential index numbers by decrementing the next index number (or START−1) down to the STOP index number, which calculates the light intensity values along the PWM curve in a right to left direction. The index number is iterated down to a minimum 0 STOP value.

The fade-in calculator of FIG. 12 begins calculations at the START−1 index number. In FIG. 12, coefficient A is multiplied by 3 and by the present index number, coefficient B multiplied by 2 and by the SHIFT parameter, and 3A is multiplied by 3, where these terms are added together to produce a first summation (which implements a first bracketed term of [3Ax+(2BS+9A)] of a recalculated fade-out incremental value equation). The first summation is multiplied by the present index number and divided by the SHIFT parameter, which is added to coefficient A multiplied by 7 and divided by the SHIFT parameter, coefficient C multiplied by the SHIFT parameter, coefficient B multiplied by 3, and an error correction term of SHIFT/2 to produce a second summation (which implements an overall bracketed term of $\{[3Ax+(2BS+9A)]x/S+(CS+3B+7A/S+S/2)\}$ of the recalculated fade-out incremental value equation). The second summation is then divided by SHIFT parameter (which implements the recalculated fade-out incremental value equation $\{[3Ax+(2BS+9A)]x/S+(CS+3B+7A/S+S/2)\}1/S$) to produce an incremental value $\Delta PWM(x)$.

This incremental value is subtracted from the previously calculated light intensity value PWM(x+1) to produce a presently calculated light intensity value PWM(x). When the index number is START−1 and the calculator of FIG. 12 is performing its first incremental calculation, PWM(x+1) is the initial light intensity value calculated by the absolute value calculator of FIG. 8. After PWM(x) is calculated, the memory component stores PWM(x), which is subtracted from the next incremental value calculation (e.g., when the index number is START−2).

The presently calculated light intensity value PWM(x) is then divided by SHIFT and is used to determine the voltage levels output to the PWM generators. Optionally, in other embodiments, a binning circuit may also be included in the calculator of FIG. 12, as described above in connection with FIG. 9.

Optionally, any of the incremental value calculators of FIG. 9-12 may include a binning circuit, which is used to further adjust the light intensity value in order to adjust the duty cycle of the PWM signal for each channel. In other words, the binning circuit provides a way to adjust the light output of each channel in order to match the light output of the LEDs when the LEDs have uneven or unmatched light outputs at a same PWM signal (e.g., some LEDs are newer and can achieve a higher brightness level than other LEDs, or some LEDs are older and are not efficiently activated by the same current in comparison to the other LEDs). For example, a binning factor of 0 achieves an output value that is 100% of the calculated light intensity value, and a maximum binning factor of 31 (for a 5 bit wide binning factor value) achieves an output value that is 75% of the calculated light intensity value. For example, the binning factor may be subtracted from 128 and divided by 128 to produce a scaling percentage that is used to adjust the light intensity value to an output value. The output value is used to output one or more voltages to the PWM generators to control the light output of the LEDs, as described above.

By now it should be appreciated that there has been provided an LED controller that is able to individually control the light output of one or more LEDs in a matrix LED display by calculating a plurality of light intensity values locally. The LED controller implements an absolute value calculator configured to calculate an initial light intensity value, and a selected incremental value calculator configured to calculate subsequent light intensity values. The selected incremental value calculator may be selected from either a fade-in incremental value calculator configured to calculate light intensity values based on increasing index numbers to implement a fade-in light output effect at the LEDs, or a fade-out incremental value calculator configured to calculate light intensity values based on decreasing index numbers to implement a fade-out light output effect at the LEDs. Each of the fade-in and fade-out incremental value calculators implement error correction terms and step normalization factors to reduce accumulated error and improve accuracy, which results in light intensity values implemented at the LEDs that closely match the desired light output curve.

In one embodiment of the present disclosure, a matrix light emitting diode (LED) system is provided, which includes: an LED controller connectable to a string of LEDs, the LED controller including: an absolute value calculator configured to calculate an initial light intensity value, wherein the initial light intensity value is a starting point on a desired light output curve; a fade-in calculator configured to calculate a first light intensity value, wherein the first light intensity value is a point on the desired light output curve that is positioned away from the starting point in a first direction; a fade-out calculator configured to calculate a second light intensity value, wherein the second light intensity value is another point on the desired light output curve that is positioned away from the starting point in a second direction opposite the first direction; processing logic configured to: select one of the fade-in calculator and the fade-out calculator as a selected incremental value calculator, based on a directional indicator that indicates whether a fade-in light output effect or a fade-out light output effect is requested, initialize coefficients of the absolute value calculator and the selected incremental value calculator with a set of coefficient values, wherein the set of coefficient values are associated with the desired light output curve, and output a set of voltage levels based on a presently calculated light intensity value; and a set of pulse width modulation (PWM) generators configured to output a set of PWM signals based on the set of voltage levels corresponding to the presently calculated light intensity value, wherein each PWM signal controls light output of a respective LED of the string of LEDs.

One aspect of the above embodiment provides that the initial light intensity value is provided as the presently calculated light intensity value, the selected incremental value calculator includes a storage element, and the initial light intensity value is provided to the selected incremental value calculator and stored in the storage element as a stored light intensity value before the selected incremental value calculator begins calculations.

A further aspect of the above embodiment provides that the selected incremental value calculator is configured to: calculate a delta light intensity value, combine the delta light intensity value with the stored light intensity value to produce a next light intensity value, and store the next light intensity value in the storage element as the stored light intensity value.

A still further aspect of the above embodiment provides that the fade-in calculator is configured to: add the delta light intensity value to the stored light intensity value to produce a next light intensity value, and the fade-out calculator is configured to: subtract the delta light intensity from the stored light intensity value to produce the next light intensity value.

Another aspect of the above embodiment provides that the absolute value calculator, when initialized with the set of coefficients, is configured to implement a polynomial function that describes the desired light output curve, wherein the polynomial function defines light intensity values as a function of index number, and the fade-in and fade-out calculators, when initialized with the set of coefficients, are configured to implement a time-discrete differential of the polynomial function that defines delta light intensity values as a function of the index number.

Another aspect of the above embodiment provides that a counter of the fade-in calculator is configured to sequentially increment an index value from a minimum value to a maximum value to generate a set of index numbers in a first sequential order, a counter of the fade-out calculator is configured to sequentially decrement an index value from the maximum value to the minimum value to generate a set of index numbers in a second sequential order opposite the first sequential order, and the selected incremental value calculator is further configured to: calculate a sequence of light intensity values, one light intensity value for each of the set of index numbers.

Another aspect of the above embodiment provides that the selected incremental value calculator is further configured to: calculate a sequence of light intensity values at an update rate equivalent to a frequency utilized by the PWM generators to generate the PWM signals, and the processing logic is further configured to: output sets of voltage levels to the set of PWM generators in a sequential manner based on the sequence of light intensity values.

Another aspect of the above embodiment provides that each PWM generator includes: a comparator configured to receive a digital oscillating signal and a respective voltage level of the set of voltage levels, wherein the respective voltage level controls a duty cycle of the PWM signal.

Another aspect of the above embodiment provides that the LED controller further includes: a plurality of switches coupled to the string of LEDs, wherein each PWM signal is provided to a control gate electrode of a respective switch coupled in parallel with a respective LED in the string of LEDs, and each PWM signal controls a switching period of the respective switch to turn the respective LED on and off to implement a time-averaged brightness level of the light output of the respective LED according to the desired light output curve.

Another aspect of the above embodiment provides that the processing logic is further configured to: receive a first value for a scaling parameter, wherein the first value indicates a first number of steps over which the desired light output curve extends, each step corresponding to an index number, and initialize the scaling parameter of the selected incremental value calculator with the first value.

A further aspect of the above embodiment provides that the processing logic is further configured to: receive a second value for the scaling parameter at a change time after receipt of the first value, wherein the second value indicates a second number of steps over which the desired light output curve extends, the second number of steps different than the first number of steps, and change the scaling parameter of the selected incremental value calculator to the second value, wherein the selected incremental value calculator continues to output presently calculated light intensity values after the change time.

A still further aspect of the above embodiment provides that a difference between a last light intensity value produced immediately before the change time and a next light intensity value produced immediately after the change time is within a threshold window.

Another aspect of the above embodiment provides that the LED controller further includes local memory configured to store a plurality of curve profiles, each storing a different set of coefficient values, and the processing logic of the LED controller is further configured to: receive a light output curve identifier (ID), wherein the light output curve ID is associated with the desired light output curve, and retrieve the set of coefficient values from the local memory, wherein the set of coefficient values are stored as part of a selected curve profile associated with the light output curve ID.

A further aspect of the above embodiment provides that the processing logic of the LED controller is further configured to: receive a different light output curve ID at a first change time after receipt of the light output curve ID, retrieve a different set of coefficient values from the local memory, wherein the different set of coefficient values are stored as part of a different curve profile associated with the different light output curve ID, and change the coefficients of the selected incremental value calculator to the different set of coefficient values, wherein the selected incremental value calculator continues to output presently calculated light intensity values after the change time.

Another aspect of the above embodiment provides that the matrix LED system further includes: a central LED microcontroller communicatively coupled to the LED controller, and an automotive central processing unit (CPU) communicatively coupled to the central LED microcontroller, wherein the automotive CPU is configured to: send one or more indications to the central LED microcontroller, in response to dynamically detected vehicular conditions, and the central LED microcontroller is configured to: send a curve profile identifier (ID) associated with the desired light output curve, in response to the one or more indications received from the automotive CPU; send a scaling parameter identifier (ID) that alters an implementation of the desired light output curve, in response to the one or more indications received from the automotive CPU, wherein different curve profile IDs and different scaling parameter IDs are sent in an ongoing and dynamic manner.

Another aspect of the above embodiment provides that the matrix LED system further includes: a plurality of LED controllers, each communicatively coupled with the central LED microcontroller and coupled to a respective string of LEDs.

Another further aspect of the above embodiment provides that the fade-in and fade-out calculators each implement a 20 bit calculation width and each is configured to implement an error correction term based on the scaling parameter to achieve a maximum error of 0.5 least significant bit per index number.

Another further aspect of the above embodiment provides that the fade-in and fade-out calculators each achieve a 12 bit light intensity value resolution and each is configured to implement a step normalization factor based on a maximum number of available steps to achieve the 12 bit light intensity value resolution at a maximum available step.

A still further aspect of the above embodiment provides that the absolute value calculator is configured to use a start index value incremented to a next index value to calculate the initial light intensity value, the fade-in calculator is configured to use the start index value incremented to a next index value to calculate the first light intensity value, and the fade-out calculator is configured to use the start index value to calculate the second light intensity value.

Another further aspect of the above embodiment provides that the absolute value calculator is configured to use a start index value to calculate the initial light intensity value, the fade-in calculator is configured to use the start index value incremented to a next index value to calculate the first light intensity value, and the fade-out calculator is configured to use the start index value decremented to a next index value to calculate the second light intensity value.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description refers to nodes or features being "connected" or "coupled" together. As used herein, unless expressly stated otherwise, "coupled" means that one node or feature is directly or indirectly joined to (or is in direct or indirect communication with) another node or feature, and not necessarily physically. As used herein, unless expressly stated otherwise, "connected" means that one node or feature is directly joined to (or is in direct communication with) another node of feature. For example, a switch may be "coupled to a plurality of nodes, but all of those nodes need not always be "connected" to each other; the switch may connect different nodes to each other depending upon the state of the switch. Furthermore, although the various schematics shown herein depict certain example arrangements of elements, additional intervening elements, devices, features, or components may be present in an actual embodiment (assuming that the functionality of the given circuit is not adversely affected).

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "activate" (or "assert" or "set") and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The processor described herein may be configured to run one or more programs. The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Also for example, in one embodiment, the illustrated components of LED controller 100 are circuitry located on a single integrated circuit or PCB or within a same device. Alternatively, the components of LED controller 100 may include any number of separate integrated circuits or separate devices interconnected with each other. For example, memory 104 may be located on a same integrated circuit as processor 102 or on a separate integrated circuit or located within another peripheral or slave discretely separate from processor 102. Peripheral and I/O circuitry may also be located on separate integrated circuits or devices. Also for example, LED controller 100 may be embodied in a hardware description language of any appropriate type, where portions of LED controller 100 may be soft or code representations of physical circuitry or of logical representations convertible into physical circuitry.

Memory 104 is a computer readable storage medium, which may be permanently or removably coupled to processor 102. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. For example, additional or fewer LEDs may be implemented in FIG. 1. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A matrix light emitting diode (LED) system comprising:
   an LED controller connectable to a string of LEDs, the LED controller comprising:
     an absolute value calculator configured to calculate an initial light intensity value, wherein the initial light intensity value is a starting point on a desired light output curve;
     a fade-in calculator configured to calculate a first light intensity value, wherein the first light intensity value is a point on the desired light output curve that is positioned away from the starting point in a first direction;
     a fade-out calculator configured to calculate a second light intensity value, wherein the second light intensity value is another point on the desired light output curve that is positioned away from the starting point in a second direction opposite the first direction;
     processing logic configured to:
       select one of the fade-in calculator and the fade-out calculator as a selected incremental value calculator, based on a directional indicator that indicates whether a fade-in light output effect or a fade-out light output effect is requested,
       initialize coefficients of the absolute value calculator and the selected incremental value calculator with a set of coefficient values, wherein the set of coefficient values are associated with the desired light output curve, and
       output a set of voltage levels based on a presently calculated light intensity value; and
     a set of pulse width modulation (PWM) generators configured to output a set of PWM signals based on the set of voltage levels corresponding to the presently calculated light intensity value, wherein each PWM signal controls light output of a respective LED of the string of LEDs.

2. The matrix LED system of claim 1, wherein
the initial light intensity value is provided as the presently calculated light intensity value,
the selected incremental value calculator comprises a storage element, and
the initial light intensity value is provided to the selected incremental value calculator and stored in the storage element as a stored light intensity value before the selected incremental value calculator begins calculations.

3. The matrix LED system of claim 2, wherein
the selected incremental value calculator is configured to:
   calculate a delta light intensity value,
   combine the delta light intensity value with the stored light intensity value to produce a next light intensity value, and
   store the next light intensity value in the storage element as the stored light intensity value.

4. The matrix LED system of claim 3, wherein
the fade-in calculator is configured to:
   add the delta light intensity value to the stored light intensity value to produce a next light intensity value, and
the fade-out calculator is configured to:
   subtract the delta light intensity from the stored light intensity value to produce the next light intensity value.

5. The matrix LED system of claim 1, wherein
the absolute value calculator, when initialized with the set of coefficients, is configured to implement a polynomial function that describes the desired light output curve, wherein the polynomial function defines light intensity values as a function of index number, and
the fade-in and fade-out calculators, when initialized with the set of coefficients, are configured to implement a time-discrete differential of the polynomial function that defines delta light intensity values as a function of the index number.

6. The matrix LED system of claim 1, wherein
a counter of the fade-in calculator is configured to sequentially increment an index value from a minimum value to a maximum value to generate a set of index numbers in a first sequential order,
a counter of the fade-out calculator is configured to sequentially decrement an index value from the maximum value to the minimum value to generate a set of index numbers in a second sequential order opposite the first sequential order, and
the selected incremental value calculator is further configured to:
calculate a sequence of light intensity values, one light intensity value for each of the set of index numbers.

7. The matrix LED system of claim 1, wherein
the selected incremental value calculator is further configured to:
calculate a sequence of light intensity values at an update rate equivalent to a frequency utilized by the PWM generators to generate the PWM signals, and
the processing logic is further configured to:
output sets of voltage levels to the set of PWM generators in a sequential manner based on the sequence of light intensity values.

8. The matrix LED system of claim 1, wherein
each PWM generator comprises:
a comparator configured to receive a digital oscillating signal and a respective voltage level of the set of voltage levels, wherein the respective voltage level controls a duty cycle of the PWM signal.

9. The matrix LED system of claim 1, wherein
the LED controller further comprises:
a plurality of switches coupled to the string of LEDs, wherein
each PWM signal is provided to a control gate electrode of a respective switch coupled in parallel with a respective LED in the string of LEDs, and
each PWM signal controls a switching period of the respective switch to turn the respective LED on and off to implement a time-averaged brightness level of the light output of the respective LED according to the desired light output curve.

10. The matrix LED system of claim 1, wherein
the processing logic is further configured to:
receive a first value for a scaling parameter, wherein the first value indicates a first number of steps over which the desired light output curve extends, each step corresponding to an index number, and
initialize the scaling parameter of the selected incremental value calculator with the first value.

11. The matrix LED system of claim 10, wherein
the processing logic is further configured to:
receive a second value for the scaling parameter at a change time after receipt of the first value, wherein the second value indicates a second number of steps over which the desired light output curve extends, the second number of steps different than the first number of steps, and
change the scaling parameter of the selected incremental value calculator to the second value, wherein the selected incremental value calculator continues to output presently calculated light intensity values after the change time.

12. The matrix LED system of claim 11, wherein
a difference between a last light intensity value produced immediately before the change time and a next light intensity value produced immediately after the change time is within a threshold window.

13. The matrix LED system of claim 1, wherein
the LED controller further comprises local memory configured to store a plurality of curve profiles, each storing a different set of coefficient values, and
the processing logic of the LED controller is further configured to:
receive a light output curve identifier (ID), wherein the light output curve ID is associated with the desired light output curve, and
retrieve the set of coefficient values from the local memory, wherein the set of coefficient values are stored as part of a selected curve profile associated with the light output curve ID.

14. The matrix LED system of claim 13, wherein
the processing logic of the LED controller is further configured to:
receive a different light output curve ID at a first change time after receipt of the light output curve ID,
retrieve a different set of coefficient values from the local memory, wherein the different set of coefficient values are stored as part of a different curve profile associated with the different light output curve ID, and
change the coefficients of the selected incremental value calculator to the different set of coefficient values, wherein the selected incremental value calculator continues to output presently calculated light intensity values after the change time.

15. The matrix LED system of claim 1, further comprising:
a central LED microcontroller communicatively coupled to the LED controller, and
an automotive central processing unit (CPU) communicatively coupled to the central LED microcontroller, wherein
the automotive CPU is configured to:
send one or more indications to the central LED microcontroller, in response to dynamically detected vehicular conditions, and
the central LED microcontroller is configured to:
send a curve profile identifier (ID) associated with the desired light output curve, in response to the one or more indications received from the automotive CPU;
send a scaling parameter identifier (ID) that alters an implementation of the desired light output curve, in response to the one or more indications received from the automotive CPU, wherein different curve profile IDs and different scaling parameter IDs are sent in an ongoing and dynamic manner.

16. The matrix LED system of claim 1, further comprising:
a plurality of LED controllers, each communicatively coupled with the central LED microcontroller and coupled to a respective string of LEDs.

17. The matrix LED system of claim 10, wherein the fade-in and fade-out calculators each implement a 20 bit calculation width and each is configured to implement an error correction term based on the scaling parameter to achieve a maximum error of 0.5 least significant bit per index number.

18. The matrix LED system of claim 10, wherein the fade-in and fade-out calculators each achieve a 12 bit light intensity value resolution and each is configured to implement a step normalization factor based on a maximum number of available steps to achieve the 12 bit light intensity value resolution at a maximum available step.

19. The matrix LED system of claim 18, wherein
the absolute value calculator is configured to use a start index value incremented to a next index value to calculate the initial light intensity value,
the fade-in calculator is configured to use the start index value incremented to a next index value to calculate the first light intensity value, and
the fade-out calculator is configured to use the start index value to calculate the second light intensity value.

20. The matrix LED system of claim 10, wherein
the absolute value calculator is configured to use a start index value to calculate the initial light intensity value,
the fade-in calculator is configured to use the start index value incremented to a next index value to calculate the first light intensity value, and
the fade-out calculator is configured to use the start index value decremented to a next index value to calculate the second light intensity value.

* * * * *